(12) United States Patent
Allington et al.

(10) Patent No.: US 10,065,054 B2
(45) Date of Patent: Sep. 4, 2018

(54) BRAKING MECHANISMS

(71) Applicant: EDDY CURRENT LIMITED PARTNERSHIP, Wellington (NZ)

(72) Inventors: Christopher James Allington, Leeston (NZ); Andrew Karl Diehl, Christchurch (NZ); Bruce John Robertson, Christchurch (NZ)

(73) Assignee: EDDY CURRENT LIMITED PARTNERSHIP, Wellington (NZ)

( * ) Notice: Subject to any disclaimer, the term of this patent is extended or adjusted under 35 U.S.C. 154(b) by 0 days.

(21) Appl. No.: 15/586,111

(22) Filed: May 3, 2017

(65) Prior Publication Data
US 2017/0274261 A1    Sep. 28, 2017

Related U.S. Application Data

(63) Continuation of application No. 14/464,255, filed on Aug. 20, 2014, which is a continuation of application
(Continued)

(30) Foreign Application Priority Data

Mar. 10, 2009 (NZ) ......................................... 575464

(51) Int. Cl.
*A62B 1/08* (2006.01)
*A62B 1/10* (2006.01)
(Continued)

(52) U.S. Cl.
CPC ................ *A62B 1/08* (2013.01); *A62B 1/10* (2013.01); *H02K 7/116* (2013.01); *H02K 49/046* (2013.01); *A63B 69/0048* (2013.01); *H02K 7/12* (2013.01); *H02K 16/005* (2013.01); *H02K 2213/09* (2013.01)

(58) Field of Classification Search
CPC ..... A62B 1/06; A62B 1/08; A62B 1/10; F16F 15/03; F16F 15/035; H02K 7/12
See application file for complete search history.

(56) References Cited

U.S. PATENT DOCUMENTS 2,122,312 A    6/1938 Cassion et al.
2,409,009 A    10/1946 Bakke
(Continued)

FOREIGN PATENT DOCUMENTS

CN    202203305 U    8/2011
CN    102627063 A    3/2012
(Continued)

OTHER PUBLICATIONS

PCT/US2008/087863, PCT Search Report dated Feb. 23, 2011.
(Continued)

*Primary Examiner* — Colleen M Chavchavadze
(74) *Attorney, Agent, or Firm* — Perkins Coie LLP

(57) ABSTRACT

An eddy-current braking mechanism including a rotor, rotatable about a rotor axis; at least one electrically conductive member coupled to the rotor for rotation therewith; at least one magnet configured to apply a magnetic field extending at least partially orthogonal to the plane of rotation of the conductive member, and characterized in that upon rotation of the rotor, the conductive member is configured to move at least partially radially from the rotor axis into the applied magnetic field.

26 Claims, 16 Drawing Sheets

Related U.S. Application Data

No. 13/255,625, filed as application No. PCT/NZ2010/000011 on Jan. 29, 2010, now Pat. No. 8,851,235.

(51) Int. Cl.
*H02K 49/04* (2006.01)
*H02K 7/116* (2006.01)
*H02K 16/00* (2006.01)
*A63B 69/00* (2006.01)
*H02K 7/12* (2006.01)

(56) References Cited

U.S. PATENT DOCUMENTS

| | | |
|---|---|---|
| 3,447,006 A | 5/1969 | Bair |
| 3,721,394 A | 3/1973 | Reiser |
| 4,078,719 A | 3/1978 | Durland et al. |
| 4,224,545 A | 9/1980 | Powell |
| 4,416,430 A | 11/1983 | Totten |
| 4,434,971 A | 3/1984 | Cordrey et al. |
| 4,561,605 A | 12/1985 | Nakajima et al. |
| 4,567,963 A | 2/1986 | Sugimoto |
| 4,612,469 A | 9/1986 | Muramatsu |
| 4,938,435 A | 7/1990 | Varner et al. |
| 5,064,029 A | 11/1991 | Araki et al. |
| 5,342,000 A | 8/1994 | Berges et al. |
| 5,465,815 A | 11/1995 | Ikegami |
| 5,692,693 A | 12/1997 | Yamaguchi et al. |
| 5,711,404 A | 1/1998 | Lee |
| 5,722,612 A | 3/1998 | Feathers |
| 5,791,584 A | 8/1998 | Kuroiwa |
| 5,862,891 A | 1/1999 | Kroger et al. |
| 6,041,897 A | 3/2000 | Saumweber et al. |
| 6,042,517 A | 3/2000 | Gunther et al. |
| 6,062,350 A | 5/2000 | Spieldiener et al. |
| 6,086,005 A | 7/2000 | Kobayashi et al. |
| 6,279,682 B1 | 8/2001 | Feathers |
| 6,293,376 B1 | 9/2001 | Pribonic |
| 6,412,611 B1 | 7/2002 | Pribonic |
| 6,460,828 B1 | 10/2002 | Gersemsky et al. |
| 6,523,650 B1 | 2/2003 | Pribonic et al. |
| 6,533,083 B1 | 3/2003 | Pribonic et al. |
| 6,557,673 B1 | 5/2003 | Desta et al. |
| 6,561,451 B1 | 5/2003 | Steinich et al. |
| 6,659,237 B1 | 12/2003 | Pribonic |
| 6,756,870 B2 | 6/2004 | Kuwahara |
| 6,793,203 B2 | 9/2004 | Heinrichs et al. |
| 6,918,469 B1 | 7/2005 | Pribonic et al. |
| 6,962,235 B2 | 11/2005 | Leon |
| 6,973,999 B2 | 12/2005 | Ikuta et al. |
| 7,011,607 B2 | 3/2006 | Kolda et al. |
| 7,018,324 B1 | 3/2006 | Lin et al. |
| 7,281,620 B2 | 10/2007 | Wolner et al. |
| 7,513,334 B2 | 4/2009 | Calver et al. |
| 7,528,514 B2 | 5/2009 | Cruz et al. |
| 7,984,796 B2 | 7/2011 | Pribonic |
| 8,272,476 B2 | 9/2012 | Hartman et al. |
| 8,490,751 B2 | 7/2013 | Robertson et al. |
| 8,556,234 B2 | 10/2013 | Hartman et al. |
| 8,567,561 B2 | 10/2013 | Strasser et al. |
| 8,851,235 B2 | 10/2014 | Allington et al. |
| 2002/0162477 A1 | 11/2002 | Palumbo |
| 2002/0179372 A1 | 12/2002 | Schreiber et al. |
| 2004/0055836 A1 | 3/2004 | Pribonic et al. |
| 2004/0168855 A1 | 9/2004 | Leon et al. |
| 2004/0191401 A1 | 9/2004 | Bytnar et al. |
| 2005/0263356 A1 | 12/2005 | Marzano et al. |
| 2006/0278478 A1 | 12/2006 | Pribonic et al. |
| 2007/0000741 A1 | 1/2007 | Pribonic et al. |
| 2007/0135561 A1 | 6/2007 | Rath et al. |
| 2007/0228202 A1 | 10/2007 | Scharf et al. |
| 2007/0256906 A1 | 11/2007 | Jin et al. |
| 2008/0074223 A1 | 3/2008 | Pribonic |
| 2008/0087510 A1 | 4/2008 | Pribonic |
| 2008/0105503 A1 | 5/2008 | Pribonic |
| 2009/0026303 A1 | 1/2009 | Schmitz et al. |
| 2009/0114892 A1 | 5/2009 | Lesko |
| 2009/0166459 A1 | 7/2009 | Niitsuma et al. |
| 2009/0178887 A1 | 7/2009 | Reeves et al. |
| 2009/0211846 A1 | 8/2009 | Taylor et al. |
| 2010/0065373 A1 | 3/2010 | Stone et al. |
| 2010/0112224 A1 | 5/2010 | Lott |
| 2011/0147125 A1 | 6/2011 | Blomberg et al. |
| 2013/0048422 A1 | 2/2013 | Hartman et al. |
| 2014/0375158 A1 | 12/2014 | Allington et al. |

FOREIGN PATENT DOCUMENTS

| | | |
|---|---|---|
| CN | 103244577 A | 4/2013 |
| DE | 9300966 U1 | 4/1993 |
| DE | 102005032694 A1 | 1/2007 |
| EP | 1244565 | 10/2002 |
| EP | 1480320 | 11/2004 |
| EP | 1564868 | 8/2005 |
| GB | 908128 A | 10/1962 |
| GB | 2352644 A | 2/2001 |
| GB | 2352645 A | 2/2001 |
| JP | 10098868 A | 4/1998 |
| JP | 11315662 A | 11/1999 |
| JP | 2000316272 A | 11/2000 |
| JP | 2001017041 A | 1/2001 |
| WO | 9516496 A1 | 6/1995 |
| WO | 2009108040 | 9/2009 |
| WO | 2009127142 A1 | 10/2009 |

OTHER PUBLICATIONS

PCT/US2008/087863, PCT Written Opinion dated Feb. 23, 2011.
Final Office Action in U.S. Appl. No. 14/464,255, dated Feb. 28, 2017, 10 pages.
Non-Final Office Action in U.S. Appl. No, 13/255,625, dated Jan. 9, 2014, 11 pages.
Non-Final Office Action in U.S. Appl. No. 14/464,255, dated Aug. 22, 2017, 5 pages.
Non-Final Office Action in U.S. Appl. No, 14/464,255, dated Feb. 20, 2018, 15 pages.
Non-Final Office Action in U.S. Appl. No. 14/464,255, dated Jul. 25, 2016, 10 pages.
Notice of Allowance in U.S. Appl. No. 13/255,625, dated Jul. 21, 2014, 11 pages.
Extended European Search Report dated Apr. 6, 2018 in European Application No. 15864540.8, 26 pages.

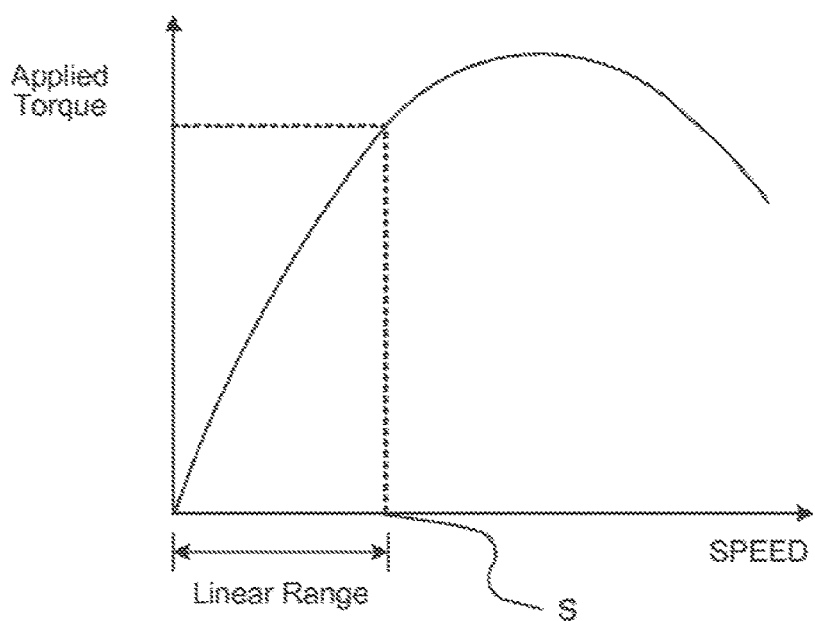

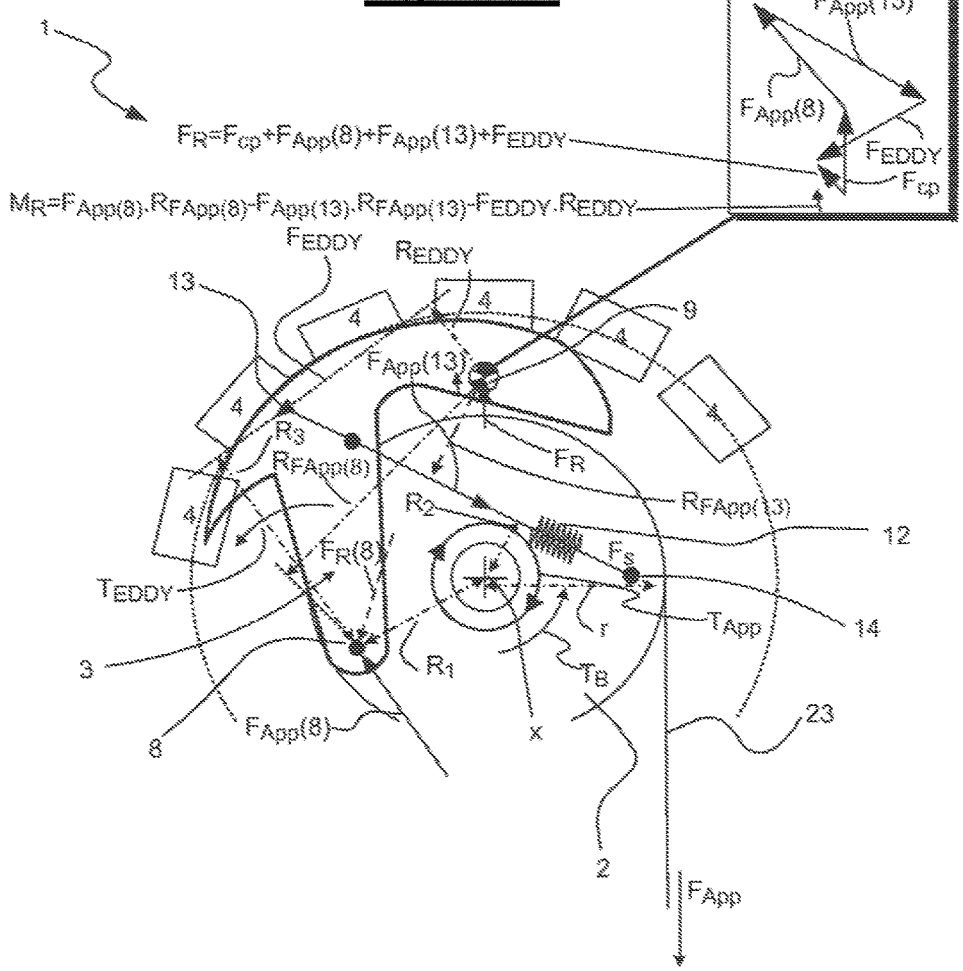

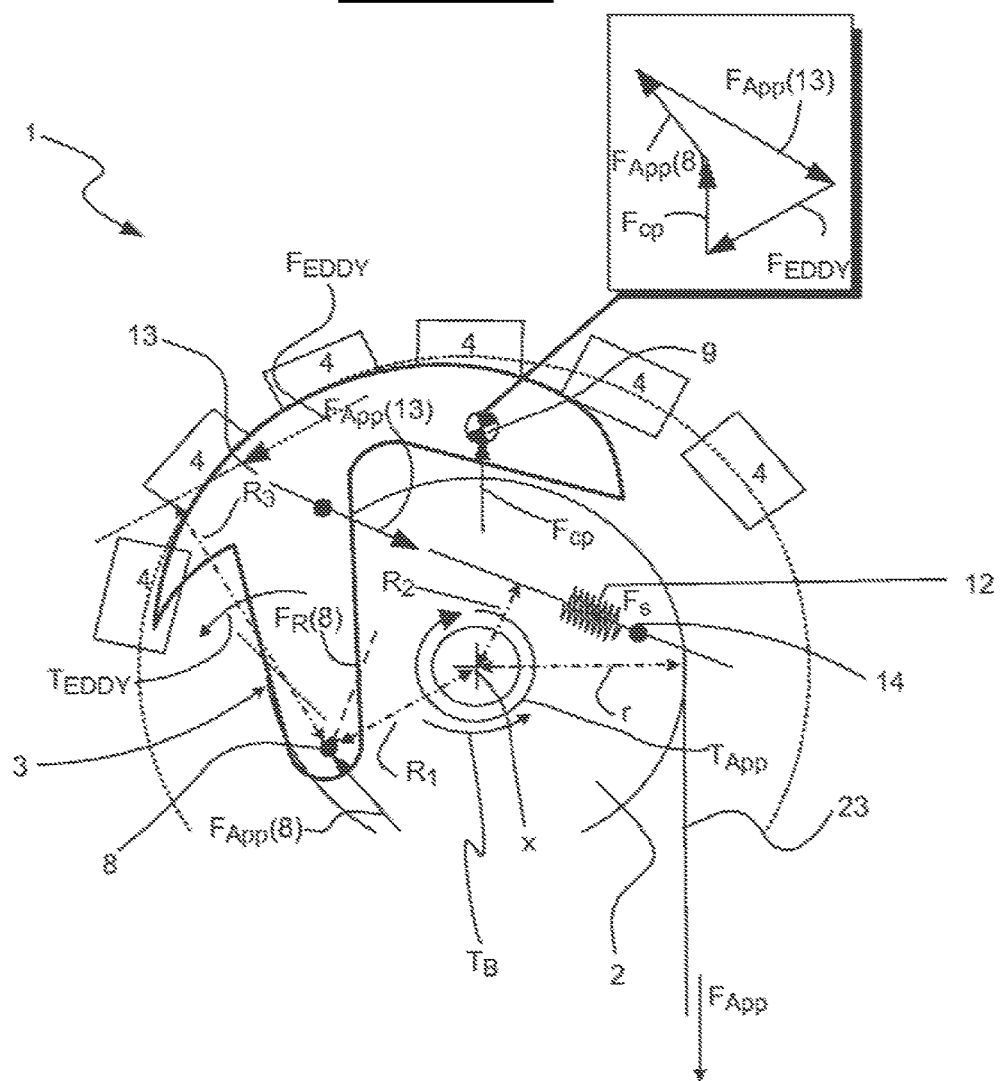

BRAKING MECHANISMS

TECHNICAL FIELD

The present invention relates to improvements in and relating to braking mechanisms and more particularly to an improved eddy-current braking mechanism.

BACKGROUND ART

Eddy-current braking systems are used in a range of applications to provide non-contact braking and offer a significant advantage over conventional friction brakes as there is no frictional contact between the braking surfaces.

Eddy-current brakes function on the principle that when a conductor moves through a magnetic field (or vice-versa) the relative motion induces circulating 'eddies' of electric current in the conductor. The current eddies in turn induce magnetic fields that oppose the effect of the applied magnetic field. Eddy-current brakes thus utilise the opposing magnetic fields to act as a brake on movement of the conductor in the magnetic field, or vice versa. The strength of the eddy current magnetic field, and therefore the opposing force is dependant on a number of factors including the:

strength of the applied magnetic field;
magnetic flux through the conductor;
geometrical dimensions of the conductor and magnetic field, e.g. size, physical separation;
electrical conductivity of the conductor; and
relative velocity between the conductor and magnetic field.

A variable braking force is thus achieved by varying any one or more of the above parameters.

To aid clarity and avoid prolixity, reference herein is made with respect to applications requiring a braking/retarding torque for rotating members and more particularly to an auto-belay system for which the present invention has particular application. However, reference herein to an auto-belay system should not be seen to be limiting as it will be appreciated by one skilled in the art that there are innumerable applications for eddy-current braking systems.

The speed of rotation (angular velocity) of the rotor with respect to the magnetic field will herein be referred to as the "rotation speed" or where convenient shortened to "speed".

Rotary plate-type eddy-current braking systems typically use a paramagnetic conductive disc that is configured to rotate in a plane orthogonal to a magnetic field applied by magnets positioned on one or both sides of the disc. The eddy currents, and corresponding magnetic field, are generated when the disc is rotated relative to the magnetic field. A braking torque is thereby applied to the rotating disc. A higher relative velocity between the conductor and magnets will result in a higher braking torque thereby potentially limiting the rotation speed.

The braking torque is linearly proportional to the speed only until a threshold 'characteristic speed' is reached. Above this characteristic speed the braking torque response to speed becomes non-linear and peaks before beginning to reduce with further speed increases. This characteristic is illustrated in FIG. 1 which shows an approximate plot of braking torque against rotation speed for a typical disc-type eddy-current braking system. The characteristic speed is dependant on the resistivity of the disc which is dependant on the temperature, materials, magnetic permeability, and construction of the disc.

The braking torque of a typical eddy current disc system operating below the characteristic speed is determined approximately by the following relationship:

$$T \propto AdB^2R^2\omega$$

Where the braking torque T is proportional to:
A—the conductor surface area intersecting the magnetic field;
$B^2$—applied magnetic field strength—squared;
d—thickness of the disc;
$R^2$—the radius (distance) from the axis of rotation to the conductor in the magnetic field—squared;
$\omega$—rotational speed.

A non-linear response of braking torque may thus be achieved by varying the magnetic field strength B and/or the distance to the center of rotation R.

The magnetic field can be supplied by permanent magnets and/or electromagnets. The strength of the magnetic field is dependant on the magnetic field intensity and the configuration of the magnetic circuit, i.e. the materials used and spatial positions of the components in the system.

For permanent magnet systems, variation of the magnetic circuit (e.g. variation in A, d or R) is the most effective way to alter the braking torque. Typical eddy-current brake systems thus position the magnets toward the periphery of the disc to maximise R.

Common magnetic circuit configurations utilise permanent magnets positioned on one or both sides of the disc with steel backing behind each magnet. The steel plates are provided to enhance the magnetic field strength while providing structural support for the magnets.

An auto-belay device is used in climbing, abseiling and the like to control the descent rate of the climber. The auto-belay also automatically retracts line when the climber is ascending to maintain line tension thus avoiding slack occurring in the line.

Existing auto-belay systems typically use a friction-brake or hydraulic dampening mechanism to control the descent rate. Friction-brakes clearly have disadvantages compared with eddy-current brakes as the frictional contact involves substantial heat generation, wear and corresponding safety problems. Hydraulic dampening mechanisms are expensive and vulnerable to leaks, pressure and calibration problems.

An ideal auto-belay system would provide a constant or controllable descent rate with minimal friction and corresponding wear while also providing sufficient braking force in a small compact device.

The prior art is replete with various eddy-current braking systems. However, none of the prior art systems appear suitable for application in an auto-belay or other applications where a constant speed of rotation is required where the torque applied may vary.

Typical prior art plate-type braking systems use various magnetic circuit configurations and have attendant pros and cons. Examples of typical prior art devices are described below.

One prior art plate-type eddy-current braking device is described in U.S. Pat. No. 4,567,963 by Sugimoto and comprises a conductive disc coupled to a rotor via an overdrive gear arrangement to rotate the disc at a proportionally greater rotational speed than the rotor. The rotor includes a spool from which a line is dispensed. A series of permanent magnets are attached to an iron plate extending parallel to the disc's plane of rotation and spaced radially with respect to the axis of rotation. These magnets produce eddy-currents in the disc during rotation and, axiomatically, a corresponding magnetic field and braking effect. The Sugimoto system also includes radiator fins to assist in dissipation of the heat generated by the eddy-currents in the disc. The rotation of the rotor is retarded with an increasing force as the rotational speed ($\omega$) increases. The overdrive arrangement provides an increased retardant force compared to a disc directly coupled to the rotor and thus, in the Sugimoto device, the aforementioned torque relationship would be similar to $T \propto AdB^2R^2k\omega$ where k is the overdrive gear ratio.

While the Sugimoto device may be more effective than simple plate-type systems it cannot be adjusted to vary the braking force applied and relies on an overdrive mechanism to improve braking force i.e. by increasing the relative speed between disc and magnetic field. The overdrive mechanism adds to cost, complexity, size, wear, increased heat generation and possibility of failure.

Furthermore, the speed of rotation of the rotor will still vary with the applied torque.

The Sugimoto device has provided a larger braking effect relative to smaller devices by varying the rotational speed. However, the gear mechanism constrains the limits of size and thus the degree of miniaturisation possible. The Sugimoto device is thus undesirable for auto-belays which require a compact device with safe, reliable operation during frequent, and/or prolonged use.

A similar device to that of Sugimoto is described in U.S. Pat. No. 5,342,000 by Berges et al. Berges et al. describe a plate-type eddy-current braking system with a centrifugal clutch that engages the eddy-current braking system when the rotor reaches a sufficient rotational speed.

It should be noted that neither the Sugimoto nor Berges et al devices can be adjusted to control the braking effect without disassembling and changing the overdrive gear ratios or magnet strength. Thus, these devices prove inconvenient in applications that need to accommodate different applied torques.

Attempts have been made at providing variable braking systems and exemplary devices are described in U.S. Pat. No. 4,612,469 by Muramatsu, EP 1,480,320 by Imanishi et al., U.S. Pat. No. 3,721,394 by Reiser and U.S. Pat. No. 6,460,828 by Gersemsky et al.

The Muramatsu device has a rotating disc with a manually adjustable position with respect to a magnet array, thus providing a means in which to vary the area (A) of magnetic field intercepted by the disc. The Muramatsu device may be adjustable to vary the braking effect and the maximum braking torque achievable but is still constrained by the size of the disc and strength of magnets, thus proving inconvenient where a smaller size is advantageous, e.g. for auto-belay devices. Furthermore, the Muramatsu device must be varied manually.

The device described by Imanashi et al works on a similar principle to that described by Muramatsu. However, instead of varying the disc area intersected by the magnetic field, the Imanashi et al system uses a magnet array attached to a linear drive to move the array axially away or toward the disc to respectively reduce or increase the separation and the magnetic field flux the disc intersects. As with the Muramatsu device, the braking effect of the Imanashi et al. cannot be automatically adjusted to accommodate different applied torques.

An automatic version of the Imanashi et al. device is described in U.S. Pat. No. 3,721,394 by Reiser and positions a line spool coupled to a conductive disc above a magnet array with a spring therebetween. As the line is unwound from the spool, the weight on the spring reduces and the spring extends, increasing the spacing between the disc and magnet and thereby decreasing the braking effect as the line is unwound. The spring is calibrated so that the speed of rotation of the spool remains constant as the line is unwound. The Reiser system is reliant on a static supporting arrangement and varying weight change in the spool and is thus unsuitable for an auto-belay device. Furthermore, the braking effect of the Reiser device varies only with rotation speed and magnetic field strength and not applied torque.

A brake for a hoist is described in U.S. Pat. No. 6,460,828 by Gersemsky et al. and uses a magnetic circuit that varies the position of a magnet with respect to a rotating conductive disc. The magnet is attached to a free end of a pivoting arm with a spring attached to the free end and to a static point adjacent the disc. As the disc rotates, the eddy-currents induced provide a braking effect on the disc to inhibit rotation. A reactive force is applied to the magnet by the braking effect to pivot the arm to move the magnet radially outward to increase braking torque. The spring will compress and oppose this reactive force thereby providing a braking effect on the disc. Reverse rotation of the disc will result in an opposing reactive force that, will force the magnet in an opposite direction, the spring then extending. and opposing the reactive force to apply the braking effect. Thus, the Gersemsky et al. system provides a sufficient braking effect regardless of the direction of rotation of the disc. The radial movement of the magnet also increases braking effect as a result of increasing relative velocity.

The Gersemsky et al. system, while fulfilling its purpose, is limited in adaptability as the braking torque applied is dependant on only the relative velocity (proportional to speed of rotation and radius to axis of rotation) of the magnets. Furthermore, auto-belay devices typically require braking in only one direction and thus universal braking devices such as the Gersemsky et al, system may be unsuitable.

It would thus be advantageous to provide an eddy-current braking mechanism that is capable of limiting the speed of rotation of a rotor over a wide range of applied loads or torques.

It is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein; this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Further aspects and advantages of the present invention will become apparent from the ensuing description which is given by way of example only.

DISCLOSURE OF INVENTION

According to a first aspect of the present invention there is provided an eddy-current braking mechanism including;
  a rotor, rotatable about a rotor axis;
  at least one electrically conductive member coupled to the rotor for rotation therewith;
  at least one magnet configured to apply a magnetic field extending at least partially orthogonal to the plane of rotation of the conductive member; and
  characterised in that upon rotation of the rotor, the conductive member is configured to move at least partially radially from the rotor axis into the applied magnetic field.

In general, movement of the conductive member through the applied magnetic field induces an eddy-current in the conductive member when the conductive member intersects the magnetic field.

To aid clarity and avoid prolixity, reference herein will be made to the conductive member being coupled to the rotor. However, it will be appreciated that a 'reverse' configuration is also possible and within the scope of the present invention. This 'reverse' configuration may have the magnet coupled to the rotor and configured to move toward a conductive member such that the conductive member will intersect the magnetic field.

To aid clarity and to avoid prolixity the present invention will be described herein with respect to a braking mechanism for an auto-belay for which the present invention has particular application. However, it should be appreciated that the present invention may be used in other rotary braking or retarding applications and thus reference herein to an auto-belay is exemplary only and should not be seen to be limiting.

It will also be appreciated that the present invention may also be used in linear braking applications by coupling the rotor to a linear device, e.g. by a cam or chain drive mechanism.

Reference herein to "radial" movement of the conductive member should be understood to include any movement with a component in a direction toward or away from the axis of rotation of the rotor and/or conductive member and should be interpreted to include both linear and non-linear radial movement.

Reference herein to "outward" radial movement refers to movement in a direction away from the axis of rotation and similarly "inward" refers to a direction toward the axis of rotation.

Reference herein to the conductive member being "coupled" to the rotor should be understood to mean any direct or indirect connection such that the conductive member rotates with the rotor. It should also be appreciated that connection need not be mechanical.

To aid clarity, the magnetic field applied by the magnet will herein be referred to as the "applied" magnetic field and the magnetic field(s) generated by eddy-currents in the conductive member are referred to as "reactive" magnetic field(s).

In preferred embodiments the eddy-current induced in the conductive member generates a reactive magnetic field opposing the applied magnetic field. The reactive force generated by the opposing 'applied' and 'reactive' magnetic fields is thus transferred to the conductive member to oppose movement thereof. As the conductive members are coupled to the rotor, the rotation of the rotor is also opposed by the reactive force.

As used herein, the terms "brake" or "braking" respectively refer to any apparatus or process for applying a force opposing movement of an object.

As used herein, the term "rotor" refers to any rotatable element and may include a: driveshaft, axle, gear, screw, disc, wheel, cog, combination thereof or any other rotatable member.

As used herein, the term "conductive member" refers to any electrically conductive, preferably non-ferrous member.

As used herein, the term "magnet" refers to any magnet or device capable of generating a magnetic field and may include electromagnets, 'permanent' magnets, 'temporary' magnets, magnetised ferromagnetic materials, or any combination thereof.

Preferably, the conductive member is configured to move at least partially radially from the rotor axis into the magnetic field.

Preferably the conductive member rotates with the rotor about the rotor axis.

It should be appreciated that the conductive member need not be directly connected to the rotor and could instead be connected via intermediate gears or other couplings. In such embodiments the gear or coupling attached to the conductive member can be considered the rotor or part thereof.

It should also be appreciated that in such embodiments where the conductive member is indirectly coupled to the rotor, the conductive member may rotate about another axis parallel or non-parallel to the rotor axis.

In a further embodiment, the rotor may be coupled to an input shaft or the like via an overdrive, or underdrive, gear transmission arrangement, such that the rotor rotates at a different speed to that of the input shaft.

Preferably, the rotor is coupled to a spool of line and configured for rotation therewith. Thus, the rate of line dispensing, or retracting, from the spool can be controlled by controlling the speed of rotation of the rotor with the braking mechanism.

Preferably, the braking mechanism includes a plurality of electrically conductive members (henceforth referred to simply as conductive members).

The braking effect may be increased by increasing the number of conductive members moving through the applied magnetic field. However, the number and size of the conductive members will be limited by the size and weight constraints of the application. Thus, for example, in auto-belay applications, preferably three said conductive members are provided.

Preferably, the conductive member is pivotally attached to the rotor and configured to pivot about a pivot axis to move at least partially radially into the applied magnetic field upon rotation of the rotor.

Preferably, the conductive member is pivotally attached to the rotor at a point eccentric to the rotor axis.

The conductive member preferably has a center of mass (or mass centroid) eccentric to the pivot and rotor axes. The conductive member will thus pivot as a result of torque applied to the conductive member by the rotor via the pivot connection and by centrifugal effects acting on the conductive member which are centred on the center of mass. The strength of centrifugal effect is dependant on the rotor speed and applied torque, thus the conductive member will move radially at a rate dependant on the rotor speed as well as a result of applied torque.

In another embodiment, the center of mass (or mass centroid) may be located at the pivot axis. For example, the conductive member may be shaped with a counter balance arrangement with an even mass distribution about the pivot axis. Such an embodiment provides a transfer of radial force directly about the pivot axis and as such does not apply a moment to the arm about the pivot axis. Therefore the braked response in this embodiment is independent of the radial force acting on the arm mass.

It should be appreciated that the conductive member may be of any shape suitable for the application. The shape of the conductive member determines the area of magnetic field intersected by the conductive member when moving radially into the magnetic field, the eddy-currents and reactive magnetic field generated, and therefore the corresponding braking torque. The shape of the conductive member may be modified to modify the braking torque characteristics required for an application.

Preferably, one end of a biasing device, such as a spring or other biasing member/mechanism, is attached to the conductive member at a point distal to the pivot axis and the other end to the rotor at a position to provide a bias opposing the radial movement of the conductive member resulting from rotor rotation. Calibration of the biasing device thus provides a means for controlling the rate of radial movement of the conductive member and therefore the area of conductive member intersecting the applied magnetic field. The braking force applied to the conductive member during movement through the applied magnetic field may also be applied to the rotor via the biasing device and/or through the attachment of the conductive member to the rotor.

Preferably, the biasing device includes a calibration mechanism capable of selectively increasing and/or decreasing the level of biasing device bias applied. Such a calibration mechanism may, for example, be provided by a tensioning screw that is capable of reversibly contracting/extending a spring to thus adjust the biasing device bias applied. Such a tensioning screw may prove useful in calibrating the braking mechanism quickly and easily without requiring disassembling to adjust or replace the biasing device. In auto-belay applications such quick calibration may prove important where it is necessary to change the maximum rotation speed required.

It will be appreciated that the biasing device may be configured to bias the conductive member toward or away from the applied magnetic field depending on the requirements of the respective application. For example, in applications requiring increasing braking torque with increasing applied torque (to prevent acceleration), the biasing device preferably biases the conductive member radially out of the applied magnetic field.

In an alternative embodiment, (for applications requiring a decreasing braking torque with applied torque) the biasing device may be attached to the conductive member and to the rotor to provide a bias to the conductive member to move the conductive member radially into the applied magnetic field. The conductive member may be configured to move radially inward on rotation, e.g. by providing a counterweight or positioning the mass centroid on an opposing side of the pivot axis to the biasing device attachment. Such an embodiment may be achieved for example by providing a conductive member on one end of a lever pivotable about an intermediate point, the other lever end having a counterweight configured to move outwardly under centrifugal effects when the rotor rotates. The conductive member, or alternatively the counterweight, may be attached to the rotor via a biasing device to bias the conductive member towards the applied magnetic field. Therefore, as the rotor rotates, the lever will pivot the conductive member away from the magnetic field against the bias and braking torque applied to the conductive member.

Preferably, the biasing device is attached to the rotor at a position spaced from the eccentric pivot axis in the direction of rotation to be braked.

In an alternative embodiment, the biasing device may be provided as a torsion spring or similar attached at one end to the rotor and at the other end to the conductive member about the pivot axis, the torsion spring configured to oppose pivoting of the conductive member toward or away (depending on the application) from the magnetic field.

The aforementioned spring configurations constrain the pivoting range of the conductive member between the maximum and minimum spring extension, preferably with, respectively, the maximum and minimum area of conductive member intersecting the applied magnetic field.

The pivoting range is also preferably constrained to one side of the pivot axis to ensure that the braking torque is only applied in one rotation direction and not the opposing direction. Such a 'unidirectional' configuration is useful in auto-belay applications where it is undesirable to have a braking effect on the line when ascending, as this will oppose the line retraction mechanism and potentially create slack in the line.

The rate at which the conductive member moves toward the magnetic field is dependant on the applied torque, 'spring' bias and the reactionary centrifugal force acting on the conductive member, i.e. the conductive member will move toward the magnetic field if the component of applied torque and centrifugal force (dependant on rotation speed and conductive member mass) opposing the spring bias is greater than the spring bias. As the spring extends, the spring 'bias' or restoring force $F_s$ increases approximately according to $F_s = k\,x$, where k is the spring constant and x is the extension from equilibrium. Once the conductive member is in the magnetic field, the eddy-current reactive force will be added to the pivoting caused by the applied torque and centrifugal force, the spring bias thus opposes all three forces and the spring will therefore extend until the restoring force equals the torque applied to the conductive member about the pivot axis.

Preferably, the braking mechanism includes a plurality of permanent magnets arranged in a generally circular or arcuate magnet array, concentric with the rotor.

In an alternative embodiment the braking mechanism may include a plurality of permanent magnets arranged in a linear array, for example in a square or triangular array, with the rotor axis generally in the center thereof.

Preferably, two said arrays are provided on opposing sides of the plane of rotation of the conductive member, the magnets of each array having opposite poles substantially opposing each other. A magnetic field is thus created that extends between the opposing poles (North opposing South) of opposing magnets, preferably in a direction substantially perpendicular to the plane of rotation of the conductive member.

In an alternative embodiment, one array may be provided on one side of the rotor and a steel or ferromagnetic plate located on the other side. However, it will be appreciated that such a 'one-sided' magnetic array may provide a weaker magnetic field than a comparative two-sided array.

In a further embodiment, the magnet array provided on one or both sides of the conductive member may be arranged in a Halbach, or similar configuration to focus the magnetic field in the direction of the conductive member.

Preferably, the magnet array is provided with a steel or other ferromagnetic backing attached to a surface of the magnets on an 'outer', opposing side to the conductive member.

In yet another embodiment the magnet may be provided as a single magnet shaped to encircle the rotor and conductive member such that radial movement of the conductive member will result in the conductive member intersecting the applied magnetic field.

It will be appreciated that in order for an eddy-current effect to be generated, the conductive member must intersect and move relative to the magnetic field. By way of example, this may be achieved by:

a) fixing the magnet in position and rotating the rotor and conductive member such that the conductive member intersects and moves through the magnetic field and vice versa; or b) rotating both the conductive member and the magnet, but at differing angular velocity, e.g. the rotor and conductive member may be configured to rotate in the same direction as the magnet but at a greater angular velocity, or alternatively, the magnet may be configured to rotate in the opposite direction to that of the conductive member.

Thus, in one preferred embodiment, the magnet is fixed in position such that it does not rotate with the rotor, the rotor and conductive members rotatable relative to the magnet such that the conductive member intersects and moves through the magnetic field. It should be appreciated that the term "fixed" as used in this embodiment refers to a magnet being static relative to the rotor, e.g. similar to a motor stator. Thus, the term "fixed" should not be interpreted to mean the magnet is fixed in position relative to any housing, superstructure or other objects.

In a preferred embodiment the magnet is configured to rotate upon rotation of the rotor at a different angular velocity to that of the rotor.

Rotation of the magnet(s) relative to the rotor as the rotor is rotating provides a mechanism for varying the relative angular velocity and hence the strength of the braking torque. The magnet(s) may be rotated in the same direction as the rotor to reduce the braking torque or in the opposite direction to increase it.

In a preferred embodiment the magnet is coupled to the rotor for rotation therewith in a substantially opposing direction to that of the rotor.

In a preferred embodiment the rotor is coupled to the magnet via a coupling transmission.

In this embodiment a coupling transmission may be used to alter the relative angular velocity of the rotor (and conductive member) relative to the magnet, where the applied torque drives a drum connected to the magnets and coupled to the rotor via a coupling transmission. In alternate embodiments the arrangement may be the other way round.

Reference to a coupling transmission throughout this specification should be understood to refer to a mechanism used to transmit power between two articles to which it is coupled. A coupling transmission may be a mechanical or fluid gear transmission, or a chain drive or friction coupling, or by any other such transmission as are well known to those skilled in the art.

For example, a gear transmission may be configured to rotate the magnet(s) in the opposing direction to that of the rotor, thereby potentially multiplying the relative velocity between the conductive member and magnet.

This braking mechanism may thus achieve an increased braking effect by increasing the relative speed between the conductive member and magnet, without a significant increase in materials or size.

In other embodiments the rotor may be coupled to the magnet by a variety of means, including by a chain drive or a friction coupling.

In a further embodiment, a stop may be provided for limiting the range of radial movement of the conductive member.

Preferably, the stop is positioned to limit the radial movement of the conductive member to a position of maximum magnetic field intercepted.

Such a stop can be utilised to transfer the braking force applied to the conductive member to the rotor by effectively 'fixing' the conductive member with respect to the rotor while the conductive member is in the magnetic field.

Furthermore, provision of such a stop provides a 'safety' feature to ensure that if the biasing device breaks, detaches or otherwise fails, the conductive member will still apply a braking torque (preferably maximum) to the rotor. Without such a stop, the conductive member may move out of the magnetic field and no longer apply a braking torque.

In an alternative embodiment, the stop may be provided as part of a biased ratchet mechanism, the conductive member moving against the bias to progressive radial positions and thus progressive levels of braking torque.

According to another aspect of the present invention there is provided an eddy-current braking mechanism including;
  a rotor, rotatable about a rotor axis;
  at least one electrically conductive member coupled to the rotor for rotation therewith;
  at least one magnet configured to apply a magnetic field extending at least partially orthogonal to the conductive member; and
characterised in that upon rotation of the rotor, the conductive member is configured to move radially outward from the rotor axis into the applied magnetic field, movement of the conductive member through the applied magnetic field thereby inducing an eddy-current in the conductive member When the conductive member intersects the magnetic field.

Preferably, the magnetic field primarily extends substantially orthogonally to the plane of rotation of the conductive member.

Preferably, a plurality of magnets and conductive members are provided, each conductive member capable of reversible movement into a magnetic field applied by one or more of the magnets.

Preferably, the conductive member is configured to move with respect to the rotor along a radial track from the rotor axis in response to rotation of the rotor.

Preferably, the conductive member is configured to move into the magnetic field as a result of radial acceleration applied by the coupled rotor, the conductive member thus moving radially outward with respect to the rotor.

Preferably, a biasing device, such as a spring or equivalent biasing member/mechanism is attached to the conductive member and to the rotor to provide a bias opposing the outward radial movement of the conductive member. Calibration of the biasing device thus provides a means for controlling the rate of radial movement of the conductive member and therefore the area of conductive member intersecting the magnetic field.

This 'linear' embodiment thus provides a braking mechanism that works independent of the direction of rotation of the rotor.

The configuration of the braking torque applied to both the 'linear' and 'pivoting' (i.e. with pivoting conductive member) embodiments can be modified and calibrated by changing the level of bias thereby providing an effective means of accommodating applications requiring specific braking torque profiles.

An eddy-current braking mechanism according to the present invention may be configured such that the speed of rotation of the rotor is constant over a range of applied torques (the "operating range"), the applied torque being the force applied to the rotor causing it to rotate. This constant speed of rotation may arise due to any increase in the applied torque (in the operating range) being balanced by an equal and opposite increase in the braking torque arising from the induced eddy current as the conductor intersects more of the magnet field.

Thus when the rotor initially begins to rotate an eddy-current braking mechanism according to the present invention behaves like a prior art device in that the speed of rotation increases substantially linearly with the applied torque. This situation continues until the electrical conductor, which is coupled to the rotor to rotate with it, enters the applied magnetic field of the magnet. Movement of the conductor through the magnetic field induces eddy currents in the conductor which oppose the motion through the magnetic field, thus providing a braking force on the motion of the conductor. The magnitude of the braking force depends on a number of factors, including the degree to which the conductor intersects the magnetic field and the strength of the field.

In an eddy-current braking mechanism according to the present invention the strength of the magnetic field, configuration of the conductor, and the biasing mechanism, may all be chosen such that an increase in torque applied to the rotor is balanced by an equal and opposite increase in braking torque throughout the required operating range of torque, thus resulting in a constant speed of rotation of the rotor throughout the operating range.

At some applied torque the conductor may intersecting the maximum area of magnetic field available under the particular embodiment of the invention. At this torque the braking force is also at a maximum. Therefore, as the applied torque is increased further the speed of rotation will again become substantially linear with respect to the increase in applied torque.

According to another aspect of the present invention there is provided a line dispensing device including:
  a braking mechanism substantially as hereinbefore described, and
  a spool of line coupled to the rotor and/or conductive member for rotation therewith.

Preferably, the line dispensing device is an auto-belay.

Preferably, the rotor and/or spool includes a biased retracting mechanism for opposing extension of line from the spool, the retracting mechanism configured to retract the line when tension applied to the line falls below a predetermined level.

As used herein, the term "line" refers to any cable, rope, string, chain, wire, strap or any other length of flexible material.

According to another aspect of the present invention there is provided a method of braking rotation of an object, the method including the steps of:
  coupling a conductive member to the object for rotation therewith;
  providing at least one magnet configured to apply a magnetic field extending of least partially into the plane of rotation of the rotatable conductive member;
  configuring the conductive member to move into the magnetic field upon rotation of the object.

According to another aspect of the present invention there is provided a method of braking rotation of an object substantially as hereinbefore described, including the further step of:
  rotating the object to thus move the conductive member into the magnetic field, the magnetic field thereby inducing an eddy-current in the conductive member.

The present invention may thus provide significant advantages over the prior art by providing an eddy-current braking mechanism capable of one or more of:
  limiting the speed to a constant level over a range of applied torques
  applying sufficient braking torque using a compact apparatus;
  providing an eddy-current brake for use with auto-descenders/auto-belays.

It will be appreciated that the present invention may therefore find particular use for speed control and/or braking in numerous applications, such as, by way of example, speed control of:
  a rotor in wind, hydro, and other rotary turbines;
  exercise equipment, e.g. rowing machines, epi-cyclic trainers;
  roller-coasters and other amusement rides;
  elevator and escalator systems;
  evacuation descenders and fire-escape devices;
  conveyor systems;
  rotary drives in factory production facilities;
  materials handling devices such as conveyor belts or a braking device in a chute for example, or to control the descent rate of an item down a slide;
  dynamic display signage, e.g. in controlling the rotation speed of rotating signs;
  roadside safety systems, e.g. the brake may be connected in a system to provide crash attenuation through the dissipation of energy in the brake.

Indeed, the present invention may be used in any rotary braking and/or speed limiting system.

BRIEF DESCRIPTION OF DRAWINGS

Further aspects and advantages of the present invention will become apparent from the following description which is given by way of example only and with reference to the accompanying drawings in which:

FIG. 1 shows a plot of Torque vs. Speed for an exemplary prior art eddy-current braking mechanism;

FIG. 5B shows a force diagram of the eddy-current braking mechanism shown in FIGS. 2 and 3 when the applied torque is increasing;

FIG. 5C shows a force diagram of the eddy-current braking mechanism shown in FIGS. 2 and 3 when a constant torque applied is matched by the braking torque, i.e. at 'steady-state';

BEST MODES FOR CARRYING OUT THE INVENTION

Figure 2A:
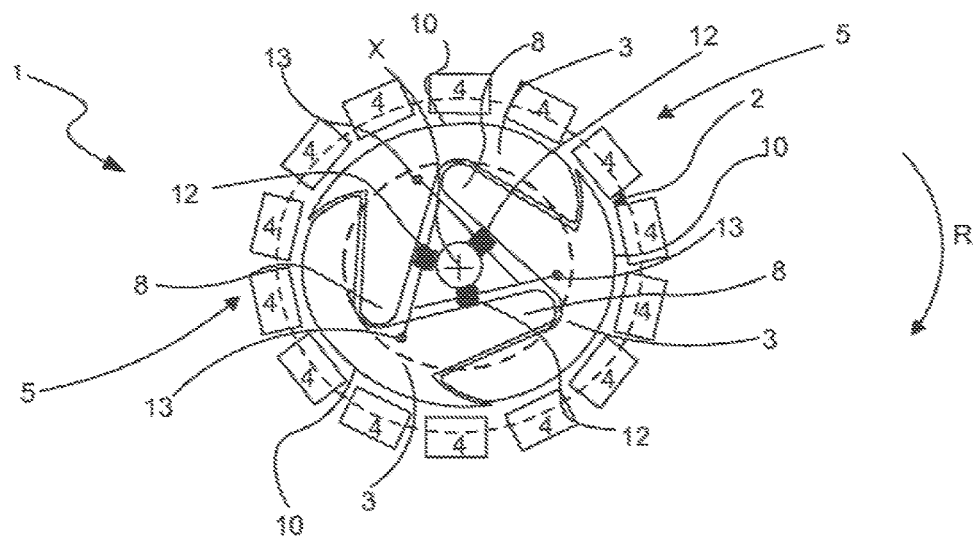
FIG. 2A shows a schematic plan diagram of an eddy current braking mechanism according to one preferred embodiment of the present invention, the rotor being stationary.

FIG. 1 shows a plot of Torque vs. Speed for an exemplary prior art eddy-current braking mechanism that utilises a conductive disc configured to rotate in a magnetic field. Eddy-currents are induced in the disc when the disc rotates and a reactive magnetic field is generated opposing the applied magnetic field. The opposing magnetic fields create a reactive force opposing movement of the disc through the magnetic field.

The magnitude of the braking torque applied to the disc is dependant on the magnetic field strength and the speed of rotation, thus as speed increases, the braking torque also increases. This system will limit the speed to a certain level depending on the applied torque. However, the braking torque and therefore equilibrium speed are only linearly proportional to the speed within a predetermined operating range (as shown in FIG. 1), until a threshold 'characteristic speed' (S) is reached where the braking torque becomes non-linear and peaks before beginning to reduce with further speed increases.

The prior art systems are thus only effective at regulating the speed with a linear response to the applied torque until the characteristic speed is reached. Thus, these prior art systems are unsuitable for auto-belay and other applications where it may be desirable to maintain a constant speed over a wider range of applied torques.

FIGS. 2A-2C, 3 and 5A-5E show an eddy-current braking mechanism according to one preferred embodiment of the present invention as generally indicated by arrow 1. For clarity, in FIGS. 5A-5E only one conductive member 3 is shown attached to the rotor 2.

The braking mechanism 1 is coupled to a spool of line (not shown) forming part of an auto-belay device (not shown). The spool of line is connected to a rotor 2 of the braking mechanism 1 and will thus rotate with the rotor 2. A line 23 extends from the spool to a harness of a user. The rotor 2 has a biased retracting mechanism (not shown) for opposing the extension of line 23 from the spool and for automatically retracting the line 23 when the line tension (and applied torque) is reduced, e.g. when a user is ascending while climbing.

The rate of line dispensing from the spool can thus be regulated by controlling the speed of rotation of the rotor 2 with the braking mechanism 1.

The braking mechanism 1 includes the rotor 2, rotatable about a rotor axis X and three electrically conductive members provided in the form of pivoting arms 3 coupled to the rotor 2. The arms 3 are pivotally attached to the rotor 2 at points 8 eccentric to the rotor axis X.

A plurality of magnets 4 are provided and fixed in position relative to the rotor axis X. The magnets 4 form two circular arrays 5 (only one shown in FIG. 2) on opposing sides of the plane of rotation of the arms 3 and rotor 2.

Figure 3:
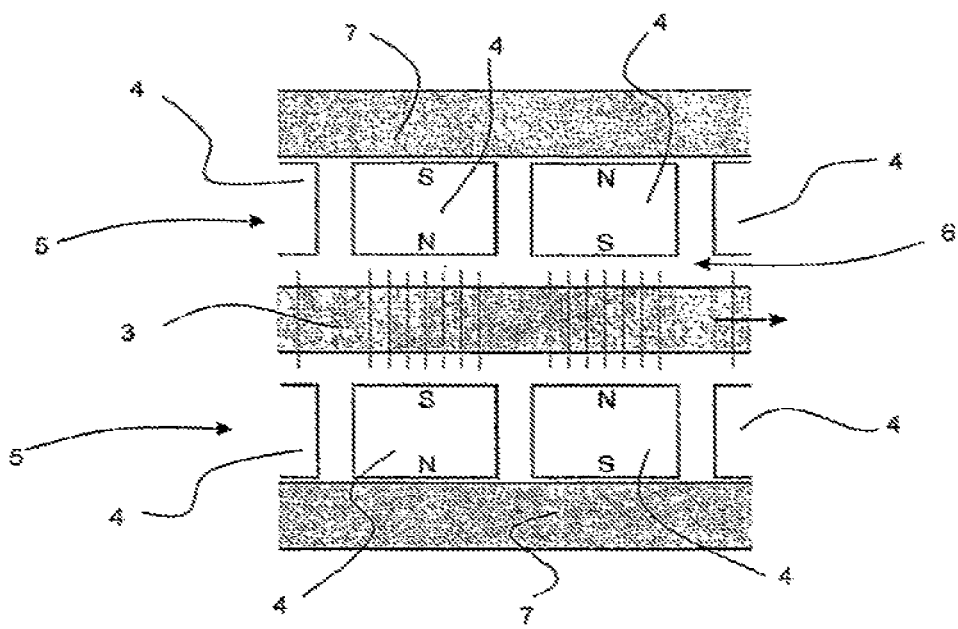
FIG. 3 shows a schematic side elevation of part of the eddy current braking mechanism of FIG. 2.

FIG. 3 shows the magnets 4 positioned either side of the plane of rotation of the arms 3.

Each magnet array 5 is arranged coaxially with the rotor 2 and applies a magnetic field 6 extending orthogonal to the plane of rotation of the arms 3.

The magnets 4 of the two magnet arrays 5 have opposite poles substantially opposing each other. Thus, a magnetic field 6 is created that extends between the opposing poles (North opposing South) of opposing magnets 4, in a direction orthogonal to the plane of rotation of the rotor 2 and arms 3.

Steel or other ferromagnetic backing 7 (shown in FIG. 3) is attached to the outer surface of each magnet array 5 on an opposing side to the arms 3. This steel backing 7 helps reinforce the magnetic field 6 as well as potentially protecting the magnets 4 from impact damage.

Figure 4:
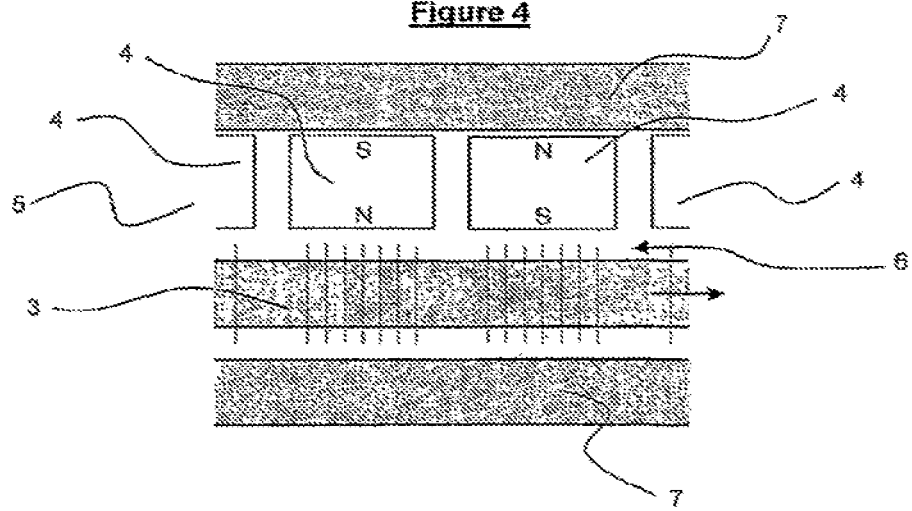
FIG. 4 shows a schematic side elevation of part of an alternative configuration to the eddy-current braking mechanism shown in FIGS. 2 and 3.

An alternative configuration is shown in FIG. 4 where only one magnet array 5 has steel backing 7.

Figure 2B:
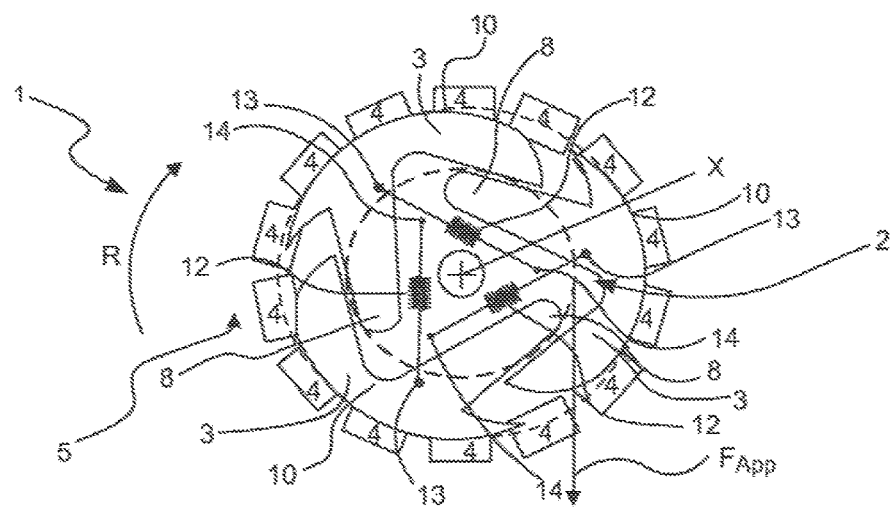
FIG. 2B shows a schematic plan diagram of the eddy current braking mechanism of FIG. 2A with the rotor rotating under an intermediate braking torque.
Figure 2C:
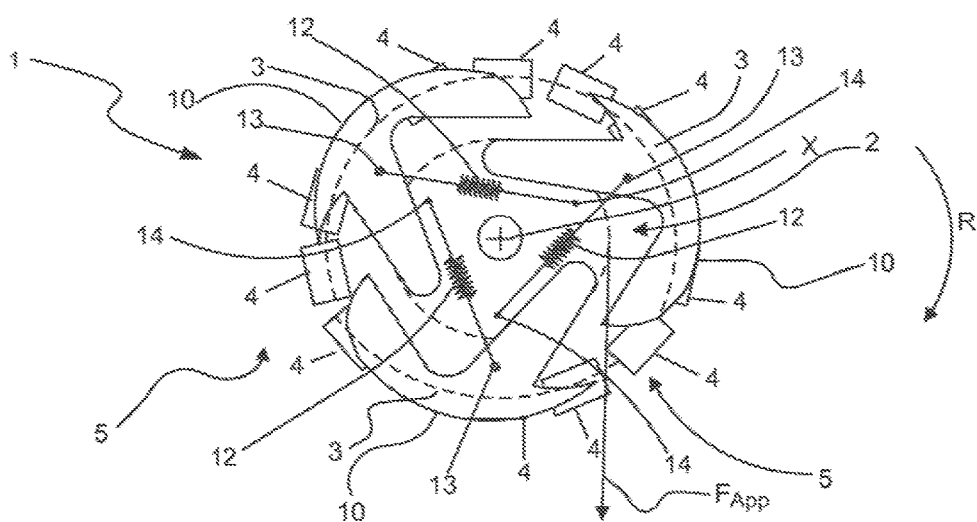
FIG. 2C shows a schematic plan diagram of the eddy current braking mechanism of FIGS. 2A and 2B with the rotor rotating under a maximum braking torque.

As shown in the progression from FIG. 2A to FIG. 2C, upon a tangential force $F_{App}$ being applied to the rotor 2 (e.g. from a climber descending), the rotor 2 will rotate and the arms 3 will pivot about pivot points 8. As the applied force $F_{App}$ accelerates the rotor 2, the arms 3 will move into, and intersect the applied magnetic field 6. Any movement of the arms 3 through the applied magnetic field 6 (e.g. when rotating) induces eddy-currents in the arms 3 which in turn generate reactive magnetic fields opposing the applied magnetic field 6.

The arms 3 have an arc-shaped outer edge 10 matching the profile of the magnet array 5 so that the maximum area of field 6 is intersected while also minimising size and weight of the arms 3. The arms 3 are shaped to nest together when the rotor is stationary, i.e. the 'rear' of each conductive member 3 is shaped to abut with the 'front' of the next conductive member 3. It will be appreciated that reference herein to the rotor being "stationary" refers to the rotor not rotating or moving relative to the magnetic field 6.

As the arms 3 pivot about the pivot points 8, a progressively greater part of each arm 3 moves into and intersects the magnetic field 6. The arms 3 are also shaped so that in the contracted position shown in FIG. 2A, the arms 3 fit together to occupy the minimal amount of space possible, thereby minimising the size requirements of the braking mechanism 1 while maximising the potential braking torque when in the magnetic field 6 as shown in FIGS. 2B and 2C.

Biasing devices are provided in the form of springs 12 attached to the arms 3 at points 13 distal to the pivot axis 8 and to the rotor 2 at a position 14 spaced from the pivot axis 8 in the direction of rotation R to be braked, i.e. shown as clockwise in FIG. 2. The springs 12 thereby provide a bias opposing the pivoting (and thereby radial) movement of the arms 3. The strength of the springs 12 can be changed to control the movement of the arms 3 toward the magnetic field 6 and therefore the characteristics of the braking mechanism 1.

The pivoting range of the arms 3 is constrained by the springs 12 to one sector, thereby ensuring that the arms 3 will only move into the magnetic field 6 when rotating in one direction. Such a 'unidirectional' configuration is useful in auto-belay applications where it is undesirable to have a braking effect on the line 23 when ascending, as this may oppose the line retraction mechanism and potentially create slack in the line 23.

Figure 12:
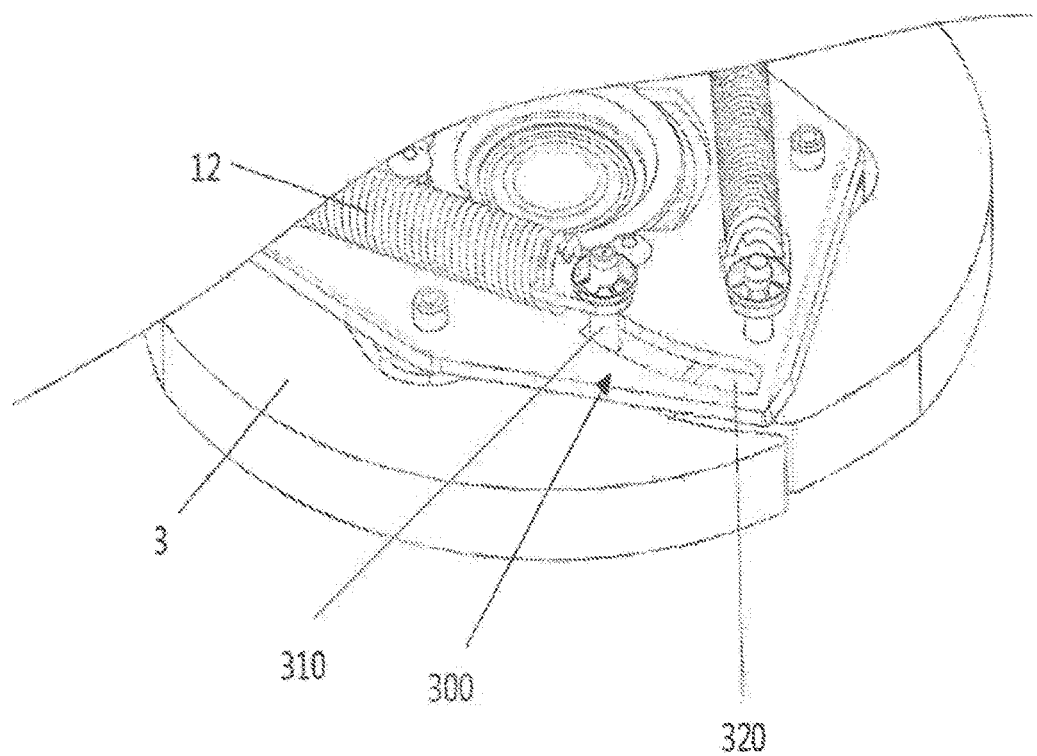
FIG. 12 shows a schematic illustration of an eddy current braking mechanism according to embodiments described herein.

With reference to FIG. 12, safety stops 300 are attached to the rotor 2 and engage with the arms 3 to limit the range of arms 3 pivoting movement. The stops 300 are formed by a sliding engagement between a protrusion (not shown) 310 attached to the arms 3 and a rigid slot (not shown) 320 that is fixed to the rotor 2. The protrusion 310 is free to slide in the slot 320 but is limited by the extent of the slot 320 which limits the range of movement of the arms 3. The stops (not shown) 300 thus provide a 'safety' feature to ensure that if the spring 12 breaks, detaches or otherwise fails, the arms 3 will still apply a braking torque (preferably maximum) to the rotor 2. The stop 300 also assists in transferring braking torque to the rotor 2 when the protrusion 310 reaches the extent of the slot 320. The arms 3 are mounted eccentrically to the rotor axis X such that each arm 3 has a center of mass 9 eccentric to the pivot 8 and rotor axes X such that when the rotor 2 rotates, the arms 3 will move radially outward and pivot the arms 3 about the pivot point 8.

In an auto-belay application, tension is placed on the line 23 wrapped about the rotor 2 or connected spool by a load (e.g. a human) and thereby applies a torque ($T_{App}=F_{App} \times r$) on the rotor 2 to cause rotation.

The applied magnetic field 6 induces eddy-currents in the arm 3 and a reactive magnetic field is generated that opposes the applied magnetic field 6. The repelling force between the applied and reactive magnetic fields thus provides a reactive force $F_{EDDY}$ opposing the movement of the arms 3 through the magnetic field 6. FIGS. 5A to 5E are partial schematic diagrams showing the forces acting on each arm 3. For clarity, only one arm 3 is shown in FIGS. 5A to 5E.

It will be appreciated that the force diagrams of FIGS. 5A-5E do not show an accurate detailed analysis of the many and varied dynamic forces acting on the arm 3 and thus the forces shown are simplistic and indicative only. The force diagrams 5A-5E, are provided to show a simplified example of the primary forces acting on the arm. Each diagram 5A-5E includes a box with the main forces added to show the approximate net force at the center of mass 9. It should be appreciated that these forces are indicative only and the force lines may not be of accurate length or direction.

Figure 5A:
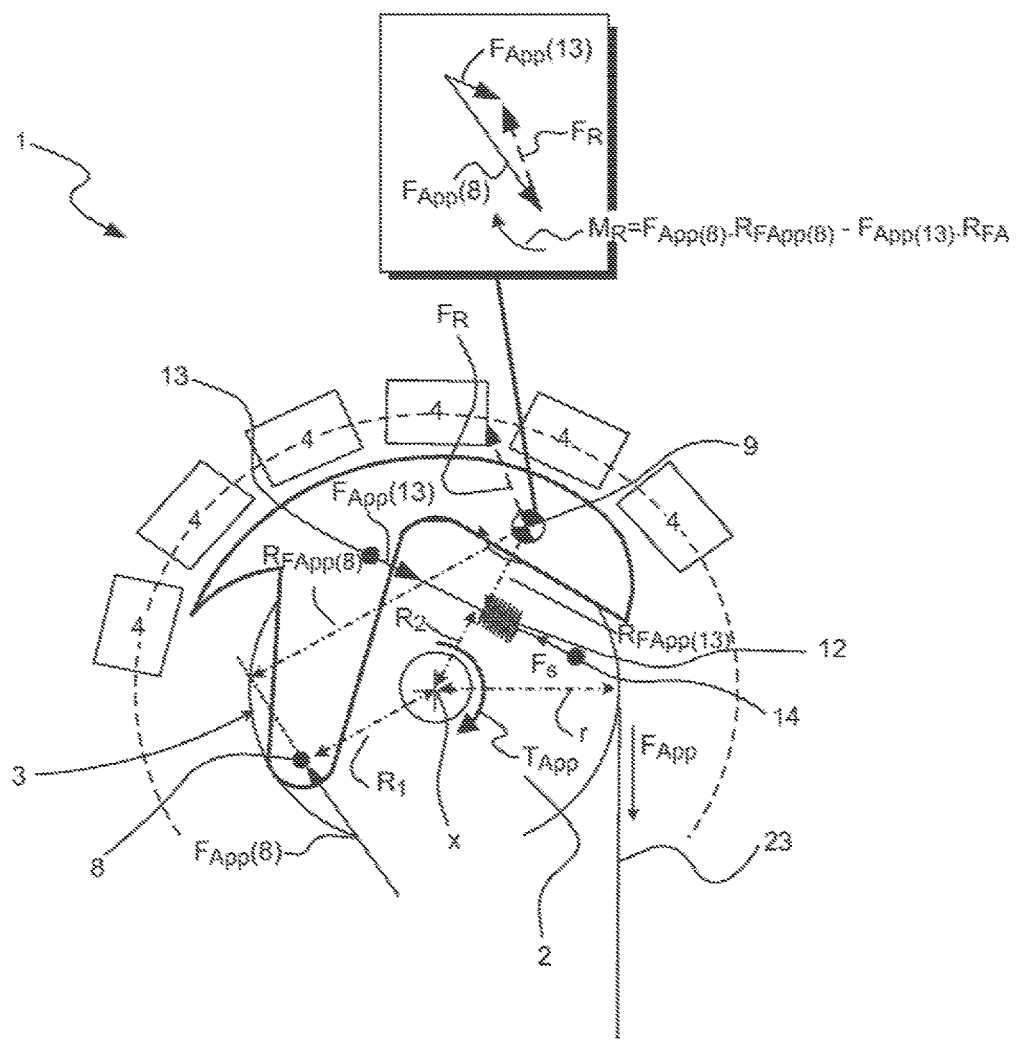
FIG. 5A shows a force diagram of the eddy-current braking mechanism shown in FIGS. 2 and 3 when a torque is initially applied to the rotor, i.e. at a 'start-up'.

FIG. 5A shows a force diagram of the eddy-current braking mechanism 1 in an initial 'start-up' stage where there is only a tangentially applied force $F_{App}$ and the spring 12 is not extended. As this force $F_{App}$ is applied tangentially to the rotor, a torque $T_{App}$ is applied to the rotor and it will accelerate from rest. Components ($F_{App}(8)$ and $F_{App}(13)$) of this force $F_{App}$ are respectively applied to the arm 3 via the pivot point 8 and spring connection 13.

It should be appreciated that in another configuration, an arm(s) may be shaped and positioned such that in the start-up phase at least a portion of the arm intersects the magnetic field. An eddy-current braking effect will thus be applied as soon as the rotor starts to rotate.

Also, as the arm 3 is connected to the rotor 2, when rotating it will accelerate toward the rotor axis X under centripetal acceleration. The centripetal force is applied to the body via the connections 8, 13. $F_{cp}$ is the force exerted by the mass centroid 9 on the arm 3 resisting the centripetal acceleration of the arm 3.

The arm 3 also has an inertia resisting changes in movement. For the purposes of this analysis this inertia will relate to the arm mass and moment of inertia acting about the mass centroid 9.

The forces shown in FIGS. 5A-5E are detailed in the following table with approximate formulae. It will be appreciated that these formulae and forces are approximate and indicative only.

| Force | Symbol | Indicative relationship formula |
|---|---|---|
| Applied Force | $F_{App}$ | Force applied by tension on line 23. |
| Applied Force through pivot point 8 | $F_{APP}(8)$ | Component of $F_{App}$ acting through pivot point 8. Approx equal to $T_{App} - \dfrac{F_{App(13)} R_2}{R_1}$ where $R_1$ is the distance of the pivot point 8 from the rotor axis X, and $R_2$ is the perpendicular distance of the spring 12 from the rotor axis X. |
| Applied Force through connection 13 | $F_{App}(13)$ | Component of $F_{App}$ acting through connection 13. Approx equal to $F_s$. |
| Applied Torque | $T_{App}$ | Approx equal to $F_{App} \times r$ where r is the radius of the rotor 2 to the line 23. |
| Applied Force through pivot 8 | $F_R(8)$ | A resultant force from the combination of $F_{App}(8)$, $F_{App}(13)$, $F_{cp}$ and $F_{EDDY}$ acting on the rotor via pivot 8 |
| Resultant Force | $F_R$ | A resultant of the force vectors $F_{App}(13)$, $F_{App}(8)$, $F_{cp}$ and $F_{EDDY}$ acting at the arm 3 mass centroid 9. |
| Resultant Moment | $M_R$ | A resultant moment acting about the arm 3 mass centroid 9 due to the of the force vectors $F_{App}(13)$, $F_{App}(8)$, $F_{cp}$ and $F_{EDDY}$ and their respective lever arms. |
| Braking force caused by eddy-current braking effect. | $F_{EDDY}$ | Braking force caused by eddy-current reactive magnetic field interacting with applied magnetic field 6. Approx proportional to area of magnetic field 6 intersected by the arms 3; strength of the magnetic field 6 intersecting the arms 3; resistivity of the arms 3; and relative velocity of the arms 3 with respect to the magnetic field 6. |
| Braking torque caused by eddy-current braking effect | $T_{EDDY}$ | Torque applied to the conductive arm 3 by the braking force $F_{EDDY}$. Approx equal to the $F_{EDDY} \times l$ where l is the perpendicular distance from the line of action of the force $F_{EDDY}$ to the pivot point 8, i.e. $R_3$ in the drawings. |
| Spring Bias force | $F_s$ | Approx equal to kx + c where k is the spring constant, x is the extension from equilibrium and c is the spring pre-tension. |
| Braking torque on rotor | $T_B$ | Proportional to the components of the braking force $F_{EDDY}$ acting through the pivot point 8 and connection 14. |
| Centrifugal force acting on the arm 3 mass centroid 9 | $F_{cp}$ | Approx equal to the mass of the arm 3 at the mass centroid 9 multiplied by $v^2/R_1$ where v is the |

| Force | Symbol | Indicative relationship formula |
|---|---|---|
| | | tangential velocity of the rotor at the pivot point X. |

In the start-up state shown in FIG. 5A, the combined force $F_R$ of the forces $F_{App}$ (8) and $F_{App}$ (13) act approximately on the mass centroid 9 of the arm 3. The offset of the forces $F_{App}$ (8) and $F_{App}$ (13) from the mass centroid 9, $R_{FApp(8)}$ and $R_{FApp(13)}$ respectively, provide a moment $M_R$ about the mass centroid 9 of the arm 3. The force $F_R$ therefore acts to accelerate the arm radially outwards and the moment $M_R$ acts to rotationally accelerate the arm in the same rotational direction as the rotor 2.

The arm 3 is constrained at the pivot point 8 but is not rigidly fixed at connection 13.

As the arm 3 is accelerated outward by the resultant force $F_R$, the arm rotates about pivot point 8 in an anticlockwise direction with respect to the rotor 2 and the spring 12 is extended thus increasing the spring bias $F_s$ and the applied force $F_{App}$(13). With an increase in $F_s$ a larger proportion of $T_{App}$ is transferred to the arm 3 via the spring 12 and the force $F_{App}$ (8) applied through the pivot 8 is reduced. The resultant force $F_R$ acting on the mass centroid 9 changes the direction in a clockwise motion.

As the applied direction of $F_R$ moves forward of a radial line from the axis X to the mass centroid 9, the force accelerates the arm 3 in a clockwise direction.

FIG. 5B shows the applied force F $F_{App}$ accelerating the rotor 2 and attached arm 3. The arm 3 is pivoted at a greater angular displacement than that shown in FIG. 5A and now intersects the magnetic field 6. The rotor 2 and arm 3 have gained angular velocity about the rotor axis X and the arm 3 is accelerated towards the rotor axis X under centripetal acceleration. The mass centroid 9 applies a centrifugal force $F_{cp}$ to the arm 3.

In addition to the rotary forces, the eddy-current braking force $F_{EDDY}$ is also applied as the arm 3 is moving through the magnetic field.

The resultant force $F_R$ of the forces $F_{App}$ (8), $F_{App}$ (13), $F_{cp1}$, and $F_{EDDY}$ act on the mass centroid 8 to accelerate the arm 3 further outward from the rotor axis X. The resulting anticlockwise rotation of the arm 3 about the pivot 8 increases the distance between connection 13 and connection 14 thereby extending the spring 12. The extension of the spring 12 increases the spring bias $F_s$ and correspondently increases $F_{App}$ (13) applied to connection 13.

The rotor 2 will continue to accelerate and the arm 3 will continue to pivot anticlockwise until the force $F_{App}$ (13) applied by the spring 12 on the arm 3 is sufficiently large to balance the forces acting on the arm such that $F_R$ and $M_R$ reduce to zero. At this point, the braking torque $T_B$ applied to the rotor through the transfer of $F_{EDDY}$ via pivot 8 and connection 14 equals the applied torque $T_{App}$, the angular acceleration is thus equal to zero and the rotor 2 will rotate at a constant speed. A steady-state equilibrium position is then reached as shown in FIG. 5C.

The variables that contribute to the braking torque $T_B$ applied to the rotor 2 can all be controlled by appropriate calibration of the springs 12 and mass centroid 9, and thus the braking mechanism 1 can provide substantial control over the braking torque $T_B$ response to suit the particular application.

Any changes in the applied torque $T_{App}$ will result in a commensurate increase in the radial displacement of the arm 3 and the braking torque $T_{EDDY}$ applied by the magnetic field 6 and the reactionary force $F_R$. However, it will be appreciated that the maximum braking torque $T_B$ achievable is constrained by the physical parameters of the mechanism 1.

Figure 5D:
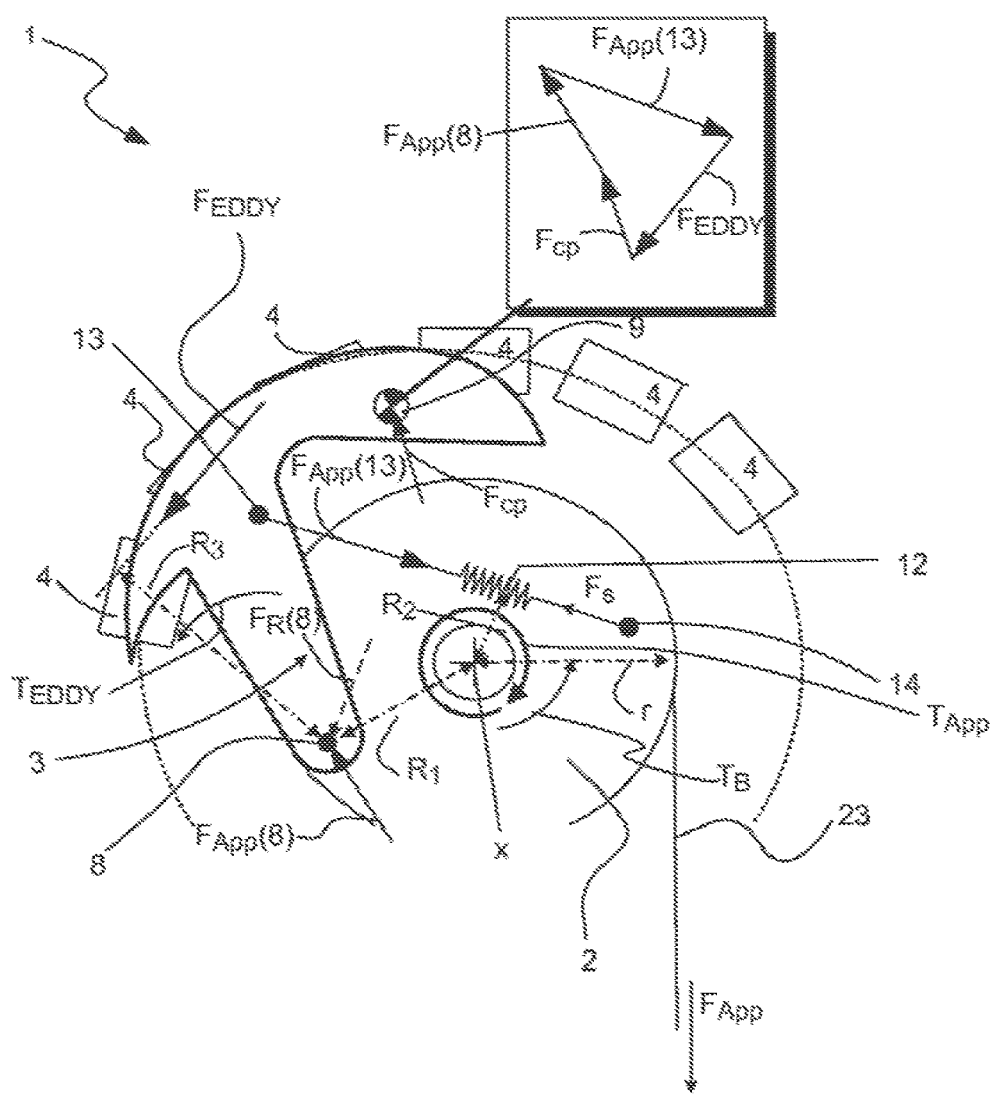
FIG. 5D shows a force diagram of the eddy-current braking mechanism shown in FIGS. 2 and 3 at maximum braking torque.

FIG. 5D shows the arm 3 at a point of maximum radial displacement where the maximum magnetic field is intersected by the arm 3. The braking torque $T_B$ is equal to the applied torque $T_{App}$. However, any further increases in applied torque $T_{App}$ will not result in the arm 3 moving radially outward as the spring is extended to its maximum extent and the arm 3 is in contact with the safety stop (not shown). The braking torque $T_B$ can therefore not increase any further. Any further increases in applied torque $T_{App}$ will therefore accelerate the rotor 2.

Figure 5E:
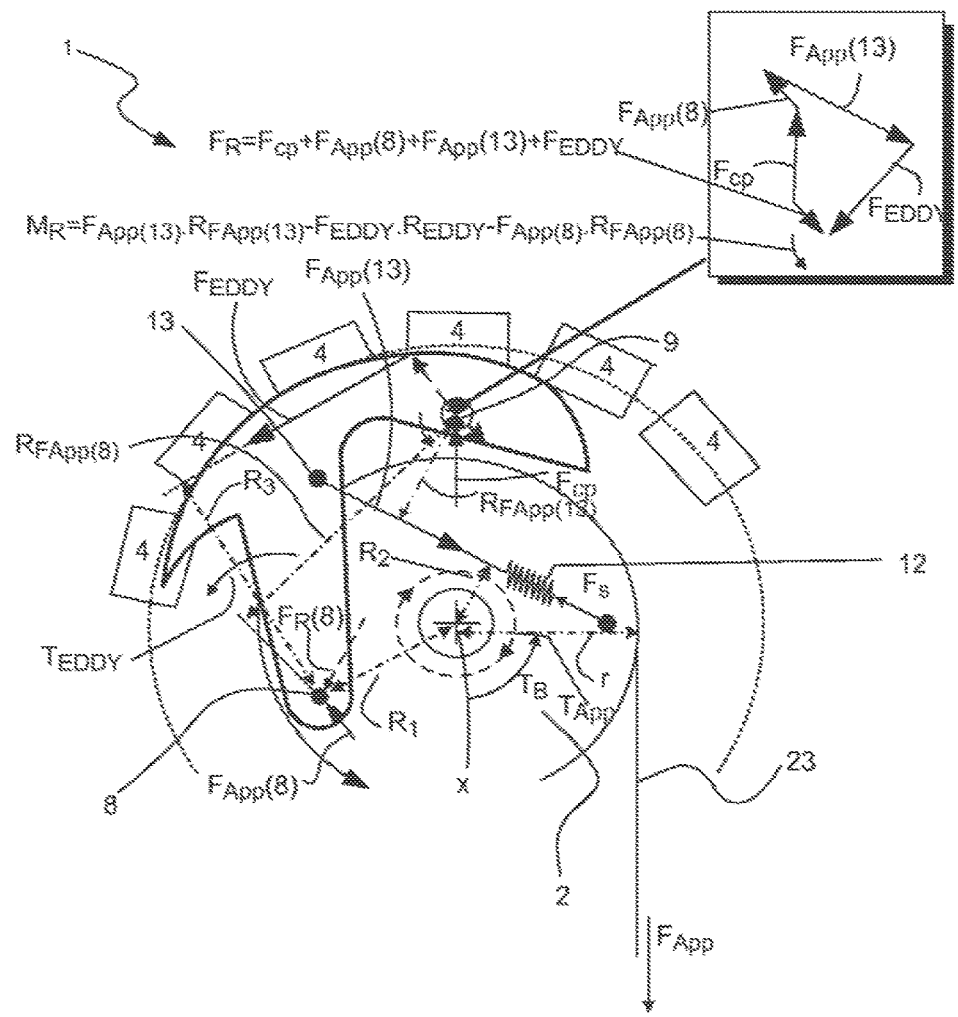
FIG. 5E shows a force diagram of the eddy-current braking mechanism shown in FIGS. 2 and 3 when the applied torque is decreasing.

FIG. 5E shows a decreasing applied torque $T_{App}$ on the braking mechanism 1.

As the applied torque $T_{App}$ is reduced, a commensurate decrease in $F_{App}$ (8) occurs to balance the applied torque $T_{App}$ while the spring bias force $F_s$ remains temporarily unchanged. The resultant force $F_R$ from the forces $F_{App}$ (8), $F_{App}$ (13), $F_{cp1}$, and $F_{EDDY}$ act on the mass centroid 9 such that it accelerates the arm 3 inward towards the rotor axis X. The resulting clockwise rotation of the arm 3 about the pivot 8 decreases the distance between connection 13 and connection 14. The resulting reduction in extension of the spring 12 results in a reduction in spring bias $F_s$ and $F_{App}$ (13). At the same time there is a reduction in the area of the arm 3 intersected by the magnetic field 6 with a corresponding reduction in the eddy-current braking force $F_{EDDY}$.

As alluded to previously, a "reverse" configuration to what has been previously described is also within the scope of the present invention. In this "reverse" configuration, the magnets may be coupled to the rotor and configured to move toward a conductive member such that the conductive member will intersect the magnetic field. With reference to FIGS. 2a-2c, 3 and 5a-5e, in the "reverse" configuration, braking mechanism 1 includes the rotor 2, rotatable about a rotor axis X, and three pivoting magnets 3 coupled to the rotor 2. The magnets 3 are pivotally coupled with the rotor 2 at points 8 eccentric to the rotor axis X. A plurality of conductive members 4 are provided and fixed in position relative to the rotor axis X. The conductive members 4 form two circular arrays 5 (only one shown in FIG. 2) on opposing sides of the plane of rotation of the magnets 3 and rotor 2.

The arm 3 continues to rotate clockwise about pivot 8 until the forces acting on the arm 3 balance such that the magnitude of $F_R$ is zero with a corresponding reduction in the acceleration of the mass centroid 9 to zero and thus the system in in a state of equilibrium. At this point the braking torque $T_B$ generated by the transfer of the eddy-current braking force $F_{EDDY}$ through the pivot 8 and connection 14 balances the applied torque $T_{App}$ and the acceleration of the rotor 2 is thus zero.

The speed of rotation can therefore be limited by adjusting the spring bias $F_s$ to ensure that the braking torque $T_B$ increases proportionally to the applied torque $T_A$ and both forces are kept equal throughout an 'operating range' of applied torques.

As aforementioned, the magnitude of the reactive force $F_{EDDY}$ is dependant on the:
- area of magnetic field 6 intersected by the arms 3;
- strength of the magnetic field 6 intersecting the arms 3;
- resistivity of the arms 3; and
- relative velocity of the arms 3 with respect to the magnetic field 6.

The braking mechanism 1 shown in FIGS. 2-5 provides automatic variation in both the area A of the applied magnetic field 6 intersected and the distance R between the arms 3 and rotor axis X by variation in the radial movement of the arms 3 into the applied magnetic field 6. Thus, in the operating range, changes in the applied torque $T_{App}$ will result in a commensurate change in the braking torque $T_B$ applied to the rotor 2.

It will be appreciated that the maximum braking torque achievable will depend on the physical constraints of the mechanism, e.g. size and strength of magnets, size, thickness and conductivity of the arm 3. Furthermore, the rotor 2 must experience a minimum applied torque, and therefore minimum rotational acceleration and speed, before the arm 3 applies a sufficient braking torque to limit the rotation speed.

The braking mechanism 1 limits the speed in an operating range between these maximum and minimum applied torques. Speed profiles of the braking mechanism 1 showing the operating range are shown in FIGS. 6 and 7.

Figure 6:
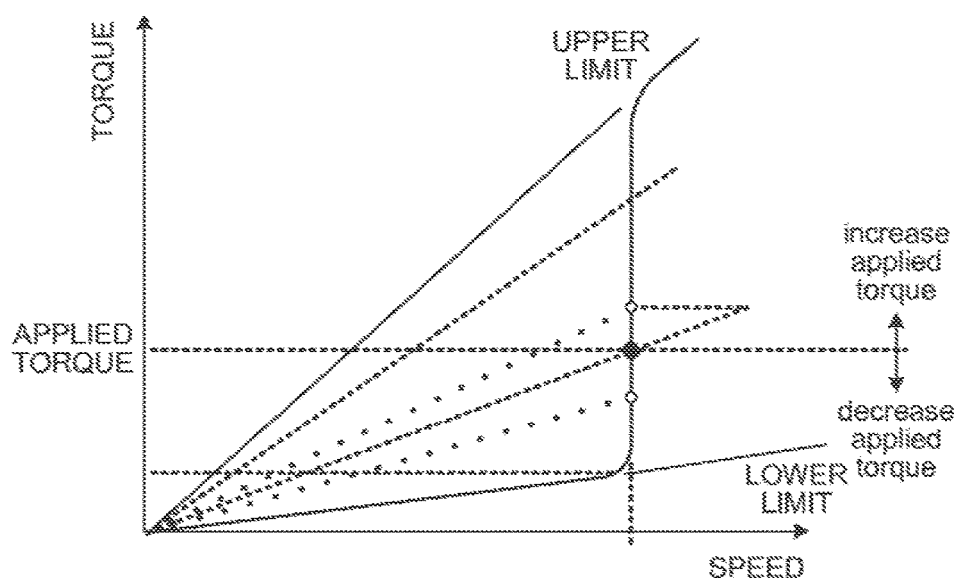
FIG. 6 shows a plot of Torque vs. Speed of the rotor used with the braking mechanism of FIGS. 2-3 and 5.
Figure 7:
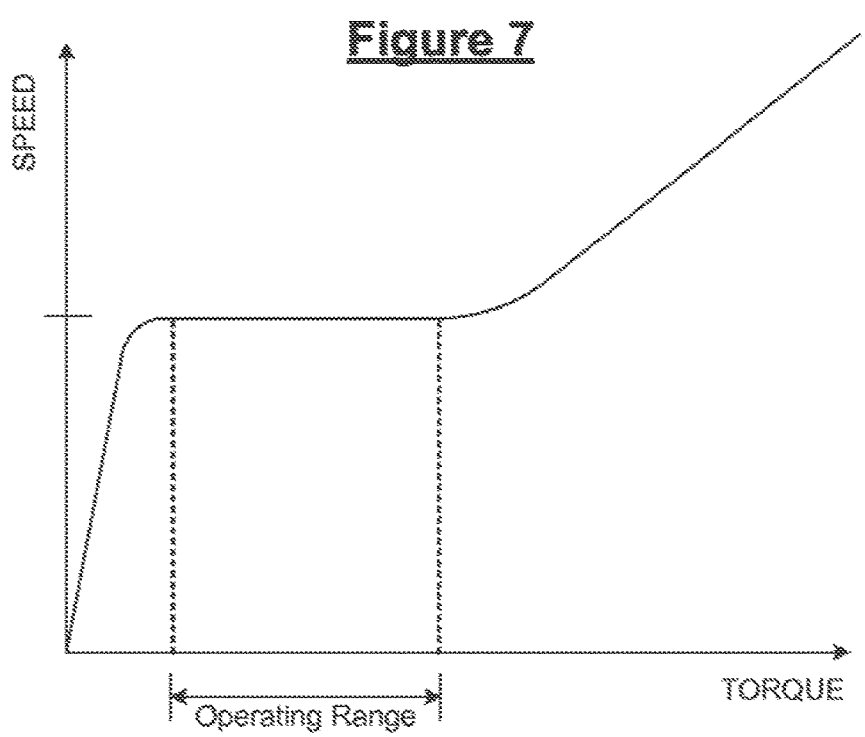
FIG. 7 shows a plot of Speed vs. Torque of the rotor used with the braking mechanism of FIGS. 2-3 and 5.

As can be seen from FIGS. 6 and 7, the speed initially increases with applied torque $T_{App}$ until the resultant force $F_R$ acting on the mass centroid 9 accelerates the arms 3 outward into the magnetic field 6 and the reactive braking force $F_{EDDY}$ is applied. The resultant braking torque $T_B$ will increase and then equal the applied torque $T_{App}$. The speed of rotation is thereby limited to a constant value as no acceleration can occur due to the applied torque $T_{App}$ being continually matched by the braking torque $T_B$. Increases in applied torque $T_{App}$ are matched by increases in braking torque $T_B$ until an upper limit is reached where the maximum area of magnetic field 6 is intersected and thus the magnetic field reactive force $F_B$ generated is proportional to speed only. After the upper limit, the speed profile is similar to prior art devices which vary the braking torque $T_B$ with speed only.

Different speed responses to applied torques can be achieved by varying the spring bias. Examples of alternative speed profiles are shown in FIGS. 8 and 9.

Figure 8:
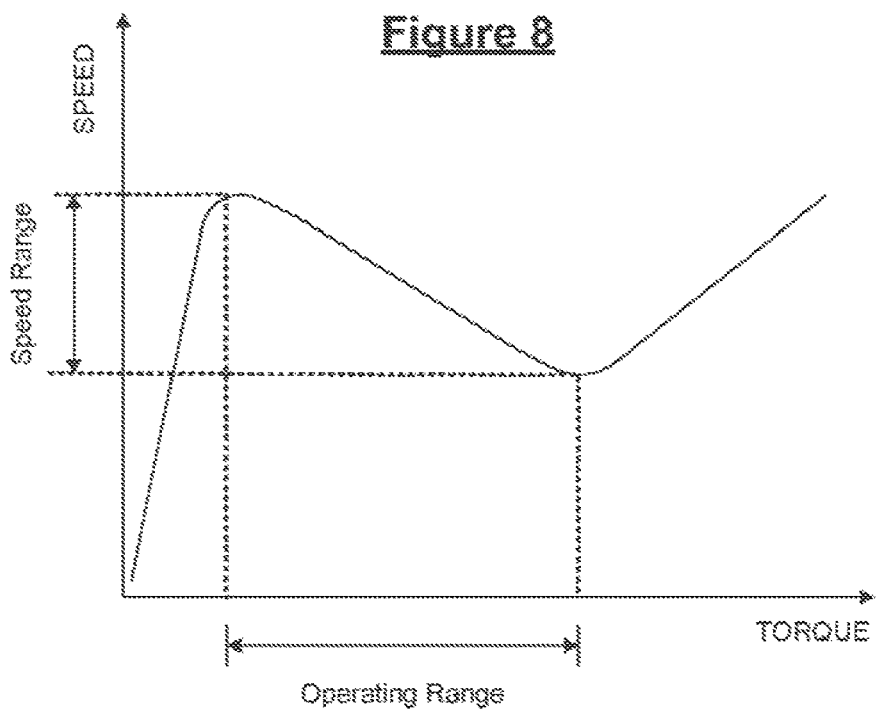
FIG. 8 shows a plot of Speed vs. Torque of an alternative configuration of the braking mechanism of FIGS. 2-3 and 5.

The profile shown in FIG. 8 is achievable by providing a relatively 'weak' spring (i.e. small restoring bias and spring constant) compared with the embodiment shown in FIGS. 6 and 7 such that the braking torque applied upon magnetic field intersection is greater than the applied torque $T_A$ throughout the operating range. Thus, the speed of rotation is reduced with increasing applied torque $T_{App}$ until the applied torque $T_{App}$ exceeds the braking torque $T_B$.

Figure 9:
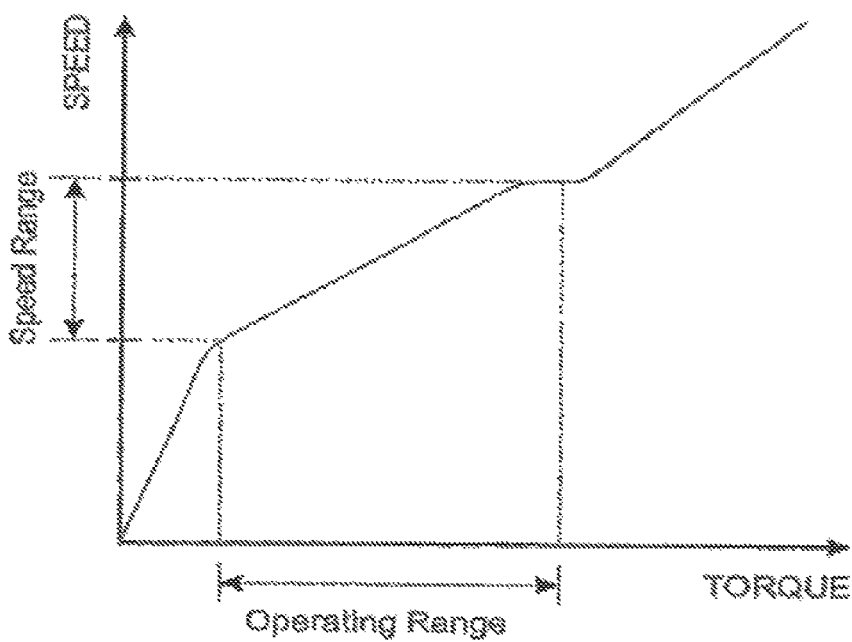
FIG. 9 shows yet another plot of Speed vs. Torque of an alternative configuration of the braking mechanism of FIGS. 2-3 and 5.

Alternatively, as shown in FIG. 9, a relatively 'strong' spring (i.e. large restoring bias and spring constant) may be used such that the applied torque $T_A$ exceeds the braking torque $T_B$ over the operating range. Thus, the speed of rotation increases linearly with increasing applied torque $T_{App}$ until the braking torque $T_B$ exceeds the applied torque $T_{App}$.

It will thus be appreciated that the present invention may be modified to accommodate any speed response required for the application simply by adjusting or changing the spring 12.

Figures 10A, 10B:
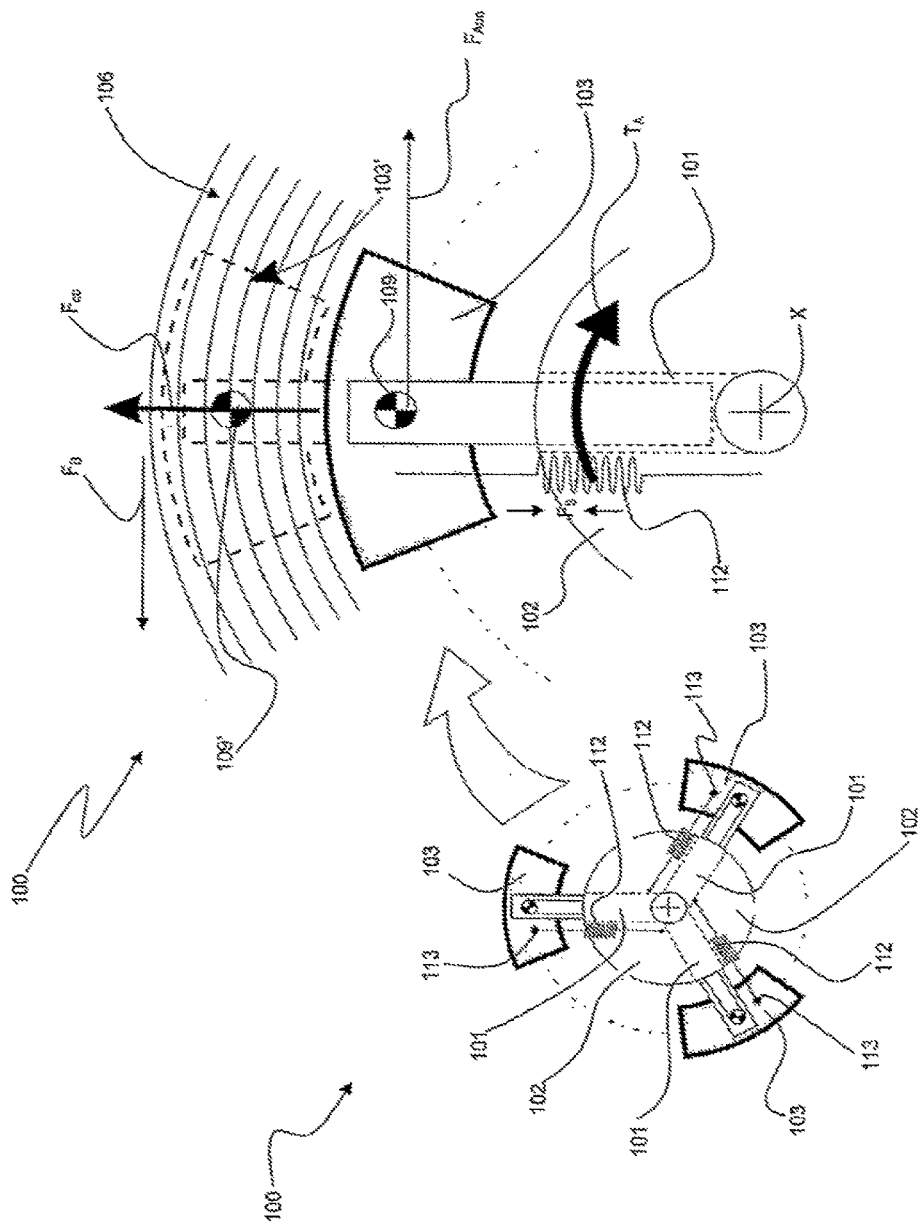
FIG. 10A shows a schematic plan diagram of an eddy current braking mechanism according to a second preferred embodiment of the present invention.
FIG. 10B shows an enlarged view of part of the braking mechanism shown in FIG. 10A.

FIG. 10 shows a braking mechanism 100 according to another embodiment of the present invention with the arms provided in the form of plates 103. The plates 103 are capable of radial movement along tracks 101 provided in the rotor 102. The plates 103 are coupled via the tracks 101 to the rotor 102 so that the plates rotate with the rotor 102 and tracks 101. Springs 112 are attached to the rotor 102 and to the plates 103. The springs 112 when extended—apply a biasing force $F_s$ to bias the plates 103 toward the rotor axis X.

The torque $T_{App}$ applies a tangential force $F_{App}$ on the plates 103 and the spring applies a centripetal force $F_{cp}$. The centripetal acceleration of the springs 112 toward the rotor axis X results in the plates 103 moving radially outwards into the magnetic field 106 while extending the springs 112. Thus, the braking force $F_B$ applied will vary proportional to the tangential velocity of the plates 103 and the spring bias $F_s$.

In contrast to the braking mechanism 1 of FIGS. 2-5, it will be appreciated that this braking mechanism 100 does not provide a set limit to the speed as the movement of the plates 103 is proportional to the rotor speed, rather than also to the applied torque as in the braking mechanism 1.

The magnet array (not shown) of this 'linear' embodiment is provided in the same configuration as that shown in the first preferred 'pivoting' embodiment shown in FIGS. 2 and 3.

As the plates 103 move radially outward under any rotor rotation (i.e. primarily under centrifugal effects), this 'linear' embodiment provides a braking mechanism 100 that works independent of the direction of rotation of the rotor 102.

Although the braking mechanism 100 provides a braking effect independent of the rotation direction, the braking torque varies only with the speed of rotation (and therefore centripetal acceleration) and not the torque applied. The speed will only be limited when the braking torque equals the applied torque and thus a greater applied torque (e.g. a heavier person) will result in the speed being limited at a higher equilibrium speed than a correspondingly 'lighter' person. Thus, this braking mechanism 100 does not provide the level of control of the braking mechanism 1 shown in FIGS. 2-5.

Figure 11:
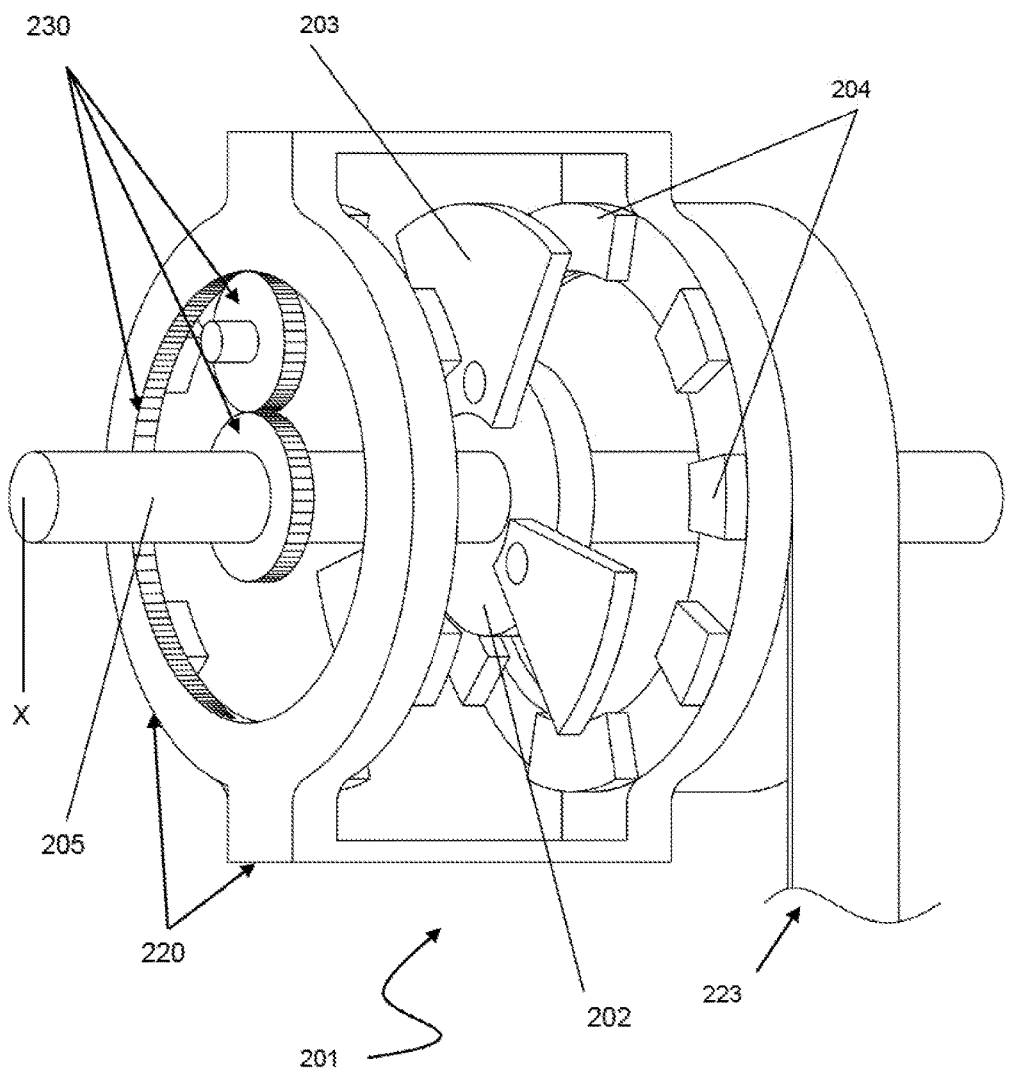
FIG. 11 shows a schematic illustration of an eddy current braking mechanism according to another embodiment of the present invention.

Another embodiment of a braking mechanism is generally indicated by arrow 201 in FIG. 11. In this embodiment an array of magnets (204) is mounted on a cradle (220). A rotor (202), having pivotally mounted conductors (203), is mounted on an axle (205) for rotation about the rotor axis (X).

The cradle (220) is configured to rotate about the rotor axis (X) and is connected to it by a gear transmission (230). In the arrangement shown in FIG. 11 the gear transmission (230) is configured such that the cradle (220) (including the magnetic array (204)) rotates in an opposite direction to the rotor (202) (and conductors (203)) thus increasing the relative angular velocity of the rotor (202) and conductor members (203) relative to the magnetic array (204). Such an arrangement for the braking mechanism may achieve an increased braking effect.

Aspects of the present invention have been described by way of example only and it should be appreciated that modifications and additions may be made thereto without departing from the scope of the appended claims.

What we claim:

1. An eddy-current braking mechanism comprising:
a rotor, rotatable about a rotor axis;
at least one magnet coupled with the rotor; and
at least one electrically conductive member positioned circumferentially about the rotor;
wherein the at least one magnet coupled with the rotor moves relative to the rotor axis when the rotor rotates around the rotor axis;
wherein upon rotation of the rotor, the at least one magnet moves radially such that at least a portion of the at least one magnet overlaps the at least one electrically conductive member in an axial direction resulting in an application of frictionless braking force to the magnets as the magnets overlap an increasing portion of the at least one electrically conductive member; and wherein a biasing device is attached to the at least one magnet and to the rotor to provide a bias opposing the outward or inward radial movement of the at least one magnet.

2. The eddy-current braking mechanism as claimed in claim 1, wherein the at least one magnet is coupled directly to the rotor.

3. The eddy-current braking mechanism as claimed in claim 1, wherein the at least one magnet is pivotally coupled to the rotor and pivots about a pivot axis.

4. The eddy-current braking mechanism as claimed in claim 1, wherein the at least one magnet has a center of mass on or eccentric to the pivot and rotor axes.

5. The eddy-current braking mechanism as claimed in claim 1, wherein the at least one magnet is pivotally attached to the rotor at a point eccentric to the rotor axis.

6. The eddy-current braking mechanism as claimed in claim 1, wherein the biasing device is attached to the rotor at a point eccentric to the pivot axis.

7. The eddy-current braking mechanism as claimed in claim 1, wherein a stop is provided for limiting the range of movement of the at least one magnet.

8. The eddy-current braking mechanism as claimed in claim 7, wherein the stop is positioned at a point of maximum overlap between the at least one magnet and the at least one electrically conductive member.

9. The eddy-current braking mechanism as claimed in claim 1, wherein the at least one electrically conductive member is arranged in two generally circular shapes or arrays, one on each opposing side of the plane of rotation of the at least one magnet.

10. The eddy-current braking mechanism as claimed in claim 1, wherein the at least one electrically conductive member shape or array is provided on one side of the rotor.

11. The eddy-current braking mechanism as claimed in claim 1, wherein the at least one magnet does not overlap the at least one electrically conductive member in a rotor axis direction when the rotor is stationary.

12. The eddy-current braking mechanism as claimed in claim 1, wherein the biasing device is attached to the at least one magnet at a point distal to the rotor axis and to the rotor at a position to provide a bias opposing the at least one magnet movement resulting from rotor rotation.

13. The eddy-current braking mechanism as claimed in claim 1, wherein the mechanism comprises at least two magnets and the magnets move independently.

14. The eddy-current braking mechanism as claimed in claim 1, wherein the mechanism includes at least two magnets and wherein the at least two magnets nest together when the rotor is stationary.

15. The eddy-current braking mechanism as claimed in claim 1, wherein the mechanism includes at least two magnets and wherein the rear of each magnet abuts with the front of the next magnet when the rotor is stationary.

16. The eddy-current braking mechanism as claimed in claim 1, wherein the at least one magnet is T-shaped.

17. The eddy-current braking mechanism as claimed in claim 1, wherein the at least one magnet has or have an at least partially arc shaped cross-section shape.

18. The eddy-current braking mechanism as claimed in claim 1, wherein the at least one magnet has or have a unidirectional configuration with braking torque only applied in one rotation direction and not the opposing direction.

19. The eddy-current braking mechanism as claimed in claim 1 wherein the rotor is a wheel.

20. An eddy-current braking mechanism including:

a rotor, rotatable about a rotor axis;

at least two magnets coupled with the rotor for rotation therewith;

and at least one electrically conductive member positioned circumferentially about the rotor;

wherein the at least two magnets pivot about a pivot axis or axes upon rotation of the rotor;

wherein, upon rotation of the rotor, the at least two magnets move at least partially away from the rotor axis via the pivot axis or axes such that at least a portion of the magnets overlap the at least one electrically conductive member in an axial direction resulting in application of a frictionless braking force to the magnets as the magnets overlap an increasing portion of the at least one electrically conductive member thereby providing a controlled speed of rotation of the rotor over an operating range of applied torques by balancing an increase in an applied torque with an equal and opposite increase in a braking torque arising from an induced eddy-current; and wherein the at least two magnets nest together when the rotor is stationary.

21. An eddy-current braking mechanism including:

a rotor, rotatable about a rotor axis;

at least two magnets coupled with the rotor for rotation therewith;

and at least one electrically conductive member positioned circumferentially about the rotor;

wherein the at least two magnets pivot about a pivot axis or axes upon rotation of the rotor;

wherein, upon rotation of the rotor, the at least two magnets move at least partially away from the rotor axis via the pivot axis or axes such that at least a portion of the magnets overlap the at least one electrically conductive member in an axial direction resulting in application of a frictionless braking force to the magnets as the magnets overlap an increasing portion of the at least one electrically conductive member thereby providing a controlled speed of rotation of the rotor over an operating range of applied torques by balancing an increase in an applied torque with an equal and opposite increase in a braking torque arising from an induced eddy-current; and wherein the rear of each magnet abuts with the front of the next magnet when the rotor is stationary.

22. An eddy-current braking mechanism including:

a rotor, rotatable about a rotor axis;

at least one T-shaped magnet coupled with the rotor for rotation therewith;

and at least one electrically conductive member positioned circumferentially about the rotor;

wherein the at least one T-shaped magnet pivot about a pivot axis or axes upon rotation of the rotor;

wherein, upon rotation of the rotor, the at least one T-shaped magnet moves at least partially away from the rotor axis via the pivot axis or axes such that at least a portion of the at least one magnet overlaps the at least one electrically conductive member in an axial direction resulting in application of a frictionless braking force to the at least one magnet as the at least one magnet overlaps an increasing portion of the at least one electrically conductive member thereby providing a controlled speed of rotation of the rotor over an operating range of applied torques by balancing an increase in an applied torque with an equal and opposite increase in a braking torque arising from an induced eddy-current.

23. An eddy-current braking mechanism comprising:
a rotor, rotatable about a rotor axis;
at least one magnet coupled with the rotor; and
at least one electrically conductive member positioned circumferentially about the rotor;
wherein the at least one magnet coupled with the rotor moves relative to the rotor axis when the rotor rotates around the rotor axis;
wherein upon rotation of the rotor, the at least one magnet moves radially such that at least a portion of the at least one magnet overlaps the at least one electrically conductive member in an axial direction resulting in an application of frictionless braking force to the magnets as the magnets overlap an increasing portion of the at least one electrically conductive member; and
wherein a biasing device is attached to the at least one magnet and to the rotor to provide a bias opposing the outward or inward radial movement of the at least one magnet.

24. The eddy-current braking mechanism as claimed in claim 23, wherein the mechanism includes at least two magnets and wherein the at least two magnets nest together when the rotor is stationary.

25. The eddy-current braking mechanism as claimed in claim 23, wherein the mechanism includes at least two magnets and wherein the rear of each magnet abuts with the front of the next magnet when the rotor is stationary.

26. The eddy-current braking mechanism as claimed in claim 23, wherein the at least one magnet is T-shaped.

* * * * *